(12) United States Patent
Kubo et al.

(10) Patent No.: US 8,619,076 B2
(45) Date of Patent: Dec. 31, 2013

(54) STEREOSCOPIC IMAGE DISPLAY CONTROL APPARATUS, STEREOSCOPIC IMAGE DISPLAY CONTROL METHOD, AND PROGRAM

(71) Applicant: Panasonic Corporation, Osaka (JP)

(72) Inventors: Seiji Kubo, Osaka (JP); Akihiro Ebina, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/722,635

(22) Filed: Dec. 20, 2012

(65) Prior Publication Data

US 2013/0187906 A1 Jul. 25, 2013

Related U.S. Application Data

(63) Continuation of application No. PCT/JP2012/033310, filed on May 21, 2012.

(30) Foreign Application Priority Data

Jan. 19, 2012 (JP) ................................ 2012-008872

(51) Int. Cl.
*G06T 15/00* (2011.01)
*G06T 15/10* (2011.01)
*H04N 13/02* (2006.01)

(52) U.S. Cl.
USPC .............................. 345/419; 345/427; 348/43

(58) Field of Classification Search
None
See application file for complete search history.

(56) References Cited

U.S. PATENT DOCUMENTS

| 8,131,064 | B2 | 3/2012 | Mashitani et al. |
| 2001/0045979 | A1* | 11/2001 | Matsumoto et al. ............ 348/43 |
| 2002/0191841 | A1* | 12/2002 | Harman ........................ 382/154 |
| 2005/0089212 | A1 | 4/2005 | Mashitani et al. |
| 2011/0058019 | A1* | 3/2011 | Onozawa ........................ 348/43 |
| 2011/0090217 | A1 | 4/2011 | Mashitani et al. |
| 2011/0102425 | A1 | 5/2011 | Ohta |

(Continued)

FOREIGN PATENT DOCUMENTS

| JP | 11-164328 A | 6/1999 |
| JP | 2004-007395 A | 1/2004 |

(Continued)

OTHER PUBLICATIONS

Japanese Office Action issued in Japanese Patent Application No. 2012-538907 dated Oct. 16, 2012.

*Primary Examiner* — Kee M Tung
*Assistant Examiner* — Leon T Cain, II
(74) *Attorney, Agent, or Firm* — McDermott Will & Emery LLP

(57) ABSTRACT

A stereoscopic image display control apparatus includes: an output unit which outputs a stereoscopic image to a display device; an input accepting unit which accepts, from a user, input of a change instruction to change a state of the stereoscopic image displayed by the display device; a change amount prediction unit which predicts amounts of change in projection and recession of the stereoscopic image in unit time to be caused when the state of the stereoscopic image is changed in accordance with the change instruction accepted by the input accepting unit; and a display control unit which decreases a change speed of the state of the stereoscopic image to be outputted from the output unit when one of the amounts of change in projection and recession in unit time predicted by the change amount prediction unit exceeds a predetermined threshold value.

20 Claims, 18 Drawing Sheets

(56) References Cited

U.S. PATENT DOCUMENTS

| | | |
|---|---|---|
| 2011/0102427 A1 | 5/2011 | Mashitani et al. |
| 2011/0102428 A1 | 5/2011 | Mashitani et al. |
| 2011/0103680 A1 | 5/2011 | Mashitani et al. |
| 2011/0157173 A1 | 6/2011 | Mashitani et al. |
| 2011/0157174 A1 | 6/2011 | Mashitani et al. |
| 2011/0157319 A1 | 6/2011 | Mashitani et al. |
| 2011/0193861 A1 | 8/2011 | Mashitani et al. |
| 2012/0044249 A1 | 2/2012 | Mashitani et al. |

FOREIGN PATENT DOCUMENTS

| | | |
|---|---|---|
| JP | 2008-103820 A | 5/2008 |
| JP | 2011-055421 A | 3/2011 |
| JP | 2011-120224 A | 6/2011 |
| JP | 2011-250318 A | 12/2011 |
| WO | WO-2012/002020 A1 | 1/2012 |

\* cited by examiner

STEREOSCOPIC IMAGE DISPLAY CONTROL APPARATUS, STEREOSCOPIC IMAGE DISPLAY CONTROL METHOD, AND PROGRAM

CROSS REFERENCE TO RELATED APPLICATION

This is a continuation application of PCT International Application No. PCT/JP2012/003310 filed on May 21, 2012, designating the United States of America, which is based on and claims priority of Japanese Patent Application No. 2012-008872 filed on Jan. 19, 2012. The entire disclosures of the above-identified applications, including the specifications, drawings and claims are incorporated herein by reference in their entirety.

FIELD

One or more exemplary embodiments disclosed herein relate generally to stereoscopic image display control apparatuses capable of displaying stereoscopic images.

BACKGROUND

In recent years, TVs, for instance, have become popular which utilize a disparity between left and right eye images so that viewers can enjoy viewing stereoscopic (three-dimensional (3D)) images. In addition, not only TVs but also mobile terminals such as personal digital assistants can display such stereoscopic images, and the environment is now widespread in which users can view stereoscopic images freely at home or outdoors. Thus, there are expectations of the development of apparatuses which enable users to freely move stereoscopic images with intension and enjoy viewing the stereoscopic images from various angles, and also allow the users to view stereoscopic images without feeling fatigued.

Patent Literature (PTL) 1 discloses an apparatus which adjusts an amount of disparity between left and right eye images in a direction for reducing user's discomfort feeling and displays the resultant images in order to prevent an object included in image data and stereoscopically viewed from being perceived as moving toward the user at a speed greater than or equal to a predetermined value.

CITATION LIST

Patent Literature

[PTL 1] Japanese Unexamined Patent Application Publication No. 2011-55421

SUMMARY

Technical Problem

However, the apparatus described in PTL 1 focuses on a change in the amount of projection of a stereoscopically viewed object toward a user, and fails to consider fatigue of the user caused by the movement of the stereoscopically viewed object in a depth direction (the receding direction). In addition, the apparatus described in PTL 1 adjusts the amount of projection by adjusting image data, and has a problem that it is not considered to maintain the size and shape of the object itself fixed.

One non-limiting and exemplary embodiment provides a stereoscopic image display control apparatus capable of reducing fatigue of a viewer.

Solution to Problem

A stereoscopic image display control apparatus according to one or more exemplary embodiments disclosed herein causes a display device to display a stereoscopic image. Specifically, the stereoscopic image display control apparatus includes: an output unit configured to output the stereoscopic image to the display device; an input accepting unit configured to accept, from a user, input of a change instruction to change the stereoscopic image displayed by the display device; a change amount prediction unit configured to predict amounts of change in projection and recession of the stereoscopic image in unit time to be caused when the stereoscopic image is changed in accordance with the change instruction accepted by the input accepting unit; and a display control unit configured to change the stereoscopic image to be outputted from the output unit, in accordance with the change instruction accepted by the input accepting unit. When one of the amounts of change in projection and recession in unit time predicted by the change amount prediction unit exceeds a predetermined threshold value, the display control unit is configured to decrease a change speed of the stereoscopic image to cause the one of the amounts of change, in unit time, in projection and recession of the stereoscopic image to be outputted from the output unit to be smaller than or equal to the threshold value.

These general and specific aspects may be implemented using a system, a method, an integrated circuit, a computer program, or a recording medium, or any combination of systems, methods, integrated circuits, computer programs, or recording media.

Advantageous Effects

According to the present disclosure, it is possible to reduce fatigue of a viewer caused by a stereoscopic image.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
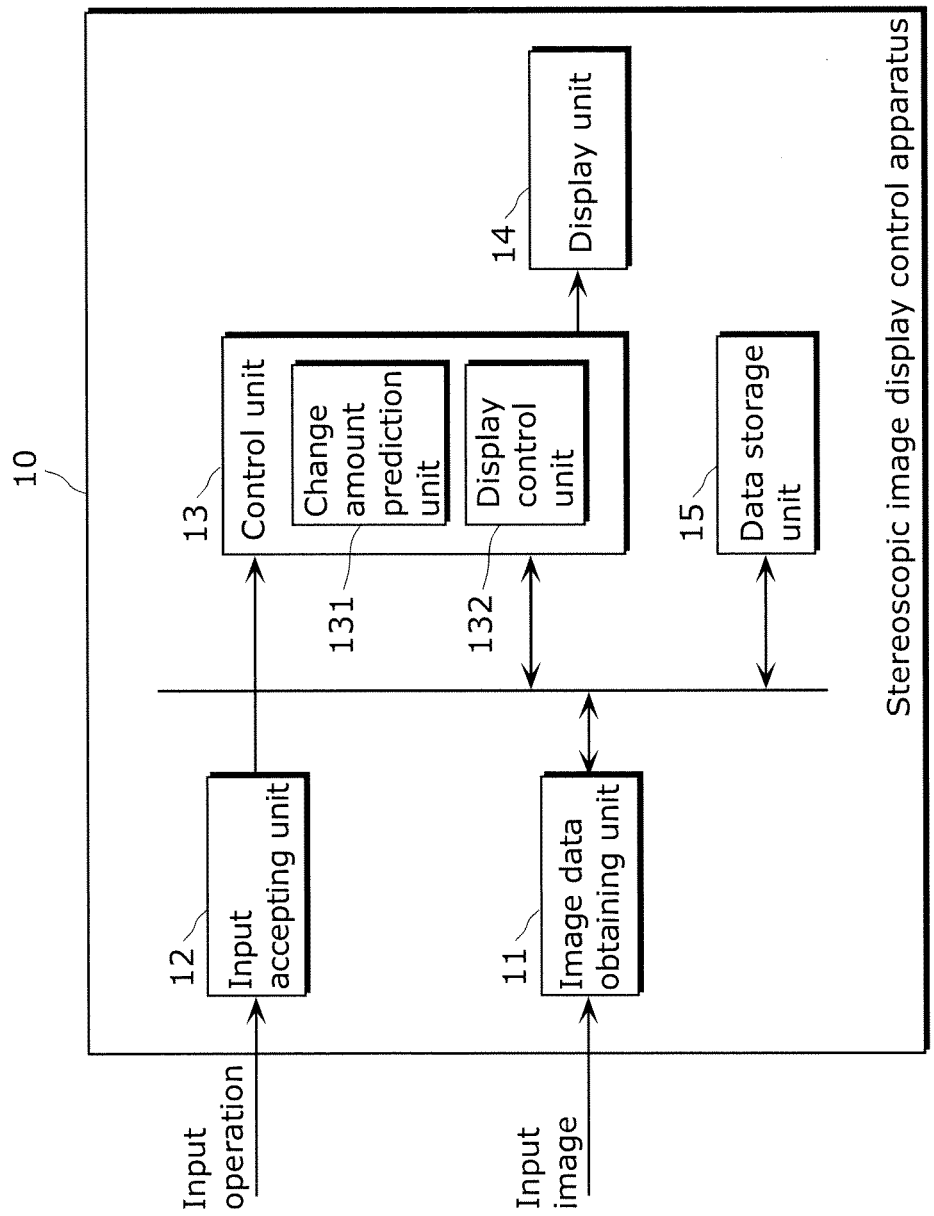
FIG. 1 is a block diagram of a stereoscopic image display control apparatus according to Embodiment 1.

A stereoscopic image display control apparatus according to one or more exemplary embodiments disclosed herein causes a display device to display a stereoscopic image. Specifically, the stereoscopic image display control apparatus includes: an output unit configured to output the stereoscopic image to the display device; an input accepting unit configured to accept, from a user, input of a change instruction to change the stereoscopic image displayed by the display device; a change amount prediction unit configured to predict amounts of change in projection and recession of the stereoscopic image in unit time to be caused when the stereoscopic image is changed in accordance with the change instruction accepted by the input accepting unit; and a display control unit configured to change the stereoscopic image to be outputted from the output unit, in accordance with the change instruction accepted by the input accepting unit. When one of the amounts of change in projection and recession in unit time predicted by the change amount prediction unit exceeds a predetermined threshold value, the display control unit is configured to decrease a change speed of the stereoscopic image to cause the one of the amounts of change, in unit time, in projection and recession of the stereoscopic image to be outputted from the output unit to be smaller than or equal to the threshold value.

As in the above configuration, if the amount of change in projection or recession in unit time exceeds a threshold value when (the state of) a stereoscopic image is changed, the fatigue of a viewer can be reduced by decreasing the change speed.

It should be noted that "to change the stereoscopic image in accordance with the change instruction" means changing (the state of) the stereoscopic image in accordance with, for example, an amount of change, a change time, or a change speed indicated in the change instruction, or the like. Furthermore, "decrease the change speed of the stereoscopic image" means changing (the state of) the stereoscopic image at a speed lower than the change speed indicated in the change instruction.

As an example, the change amount prediction unit may be configured to: predict, as the amount of change in projection in unit time, a difference between amounts of projection at points of the stereoscopic image which project most from a display surface of the display device at a start and an end of the unit time; and predict, as the amount of change in recession in unit time, a difference between amounts of recession at points of the stereoscopic image which recede most from the display surface of the display device at a start and an end of the unit time.

In this manner, the amounts of change in projection and recession in unit time can be predicted, using a first point that is most distant from the display surface before (the state of) the stereoscopic image is changed, and a second point that is different from the first point and most distant from the display surface after (the state of) the stereoscopic image is changed.

As another example, the change amount prediction unit may be configured to: predict, as the amount of change in projection in unit time, a difference between amounts of projection at a specific point of the stereoscopic image at a start and an end of the unit time; and predict, as the amount of change in recession in unit time, a difference between amounts of recession at the specific point of the stereoscopic image at a start and an end of the unit time.

In addition, the amounts of change in projection and recession in unit time can be predicted, using the distances between the display surface and a specific point (the same point) of the stereoscopic image before and after (the state of) the stereoscopic image is changed. A "specific point" may be, for example, a pattern (texture) given on the surface of the stereoscopic image, or a point of the stereoscopic image at which the finger is put when (the state of) the stereoscopic image is changed by moving the finger put on the stereoscopic image.

As an example, the change instruction may include information for identifying an amount of change in the stereoscopic image, and a change time to be used for changing the stereoscopic image by the amount of change. When one of the amounts of change in projection and recession in unit time predicted by the change amount prediction unit exceeds the threshold value, the display control unit may be configured to change the stereoscopic image by the amount of change, taking a time longer than the change time.

In this manner, the change speed of the stereoscopic image can be decreased by taking a longer time than the change time indicated in the change instruction, to change (the state of) the stereoscopic image by the same amount as the amount of change indicated in the change instruction.

As another example, the change instruction may include information for identifying an amount of change in the stereoscopic image, and a change time to be used for changing the stereoscopic image by the amount of change. When one of the amounts of change in projection and recession in unit time predicted by the change amount prediction unit exceeds the threshold value, the display control unit may be configured to change the stereoscopic image by an amount smaller than the amount of change during the change time.

In addition, the change speed of the stereoscopic image can be decreased by changing, during the same time period as the change time indicated in the change instruction, (the state of) the stereoscopic image by the amount smaller than the amount of change indicated in the change instruction.

As yet another example, when one of the amounts of change in projection and recession in unit time predicted by the change amount prediction unit exceeds the threshold value, the display control unit may be configured not to change the stereoscopic image in accordance with the change instruction.

Furthermore, the change speed of the stereoscopic image can be decreased by not making the change at all in (the state of) the stereoscopic image indicated in the change instruction (by setting the change speed to 0).

For example, the change instruction to change the stereoscopic image accepted by the input accepting unit may include moving, rotating, enlarging, or reducing the stereoscopic image.

As an example, the input accepting unit may be configured to accept the change instruction indicating a predetermined amount of change, through a predefined input operation by a user.

The above example applies to a case in which the stereoscopic image rotates to the right by 45 degrees (an example of a predetermined amount of change) by a user depressing a right rotation button (an example of a predetermined operation), for example.

As another example, the input accepting unit may be configured to accept the change instruction indicating an amount of change according to a magnitude of an input operation by a user.

The above example applies to a case of causing the amount of change in (the state of) the stereoscopic image to continuously vary according to an amount of slide (an example of the magnitude of an input operation) caused when a user slides his/her finger on the display screen, for example.

The stereoscopic image display control apparatus may further include the display device.

As described above, the stereoscopic image display control apparatus may include the display device, or may control the display of an external display device.

A stereoscopic image display control method according to one or more exemplary embodiments disclosed herein is a method for causing a display device to display a stereoscopic image. Specifically, the stereoscopic image display control method includes: outputting the stereoscopic image to the display device; accepting, from a user, input of a change instruction to change the stereoscopic image displayed by the display device; predicting amounts of change in projection and recession of the stereoscopic image in unit time to be caused when the stereoscopic image is changed in accordance with the change instruction accepted in the acceptance; and changing the stereoscopic image to be outputted in the output, in accordance with the change instruction accepted in the acceptance. When one of the amounts of change in projection and recession in unit time predicted in the prediction exceeds a predetermined threshold value, a change speed of the stereoscopic image is decreased in the change to cause the one of the amounts of change, in unit time, in projection and recession of the stereoscopic image to be outputted in the output to be smaller than or equal to the threshold value.

A program (non-transitory computer-readable recording medium) according to one or more exemplary embodiments disclosed herein causes a computer to cause a display device to display a stereoscopic image. Specifically, the program (non-transitory computer-readable recording medium) causes the computer to execute: outputting the stereoscopic image to the display device; accepting, from a user, input of a change instruction to change the stereoscopic image displayed by the display device; predicting amounts of change in projection and recession of the stereoscopic image in unit time to be caused when the stereoscopic image is changed in accordance with the change instruction accepted in the acceptance; and changing the stereoscopic image to be outputted in the output, in accordance with the change instruction accepted in the acceptance. When one of the amounts of change in projection and recession in unit time predicted in the prediction exceeds a predetermined threshold value, a change speed of the stereoscopic image is decreased in the change to cause the one of the amounts of change, in unit time, in projection and recession of the stereoscopic image to be outputted in the output to be smaller than or equal to the threshold value.

Hereinafter, certain exemplary embodiments are described with reference to the drawings. Each of the exemplary embodiments described below shows a general or specific example. The numerical values, shapes, materials, structural elements, the arrangement and connection of the structural elements, steps, the processing order of the steps ant the like shown in the following exemplary embodiments are mere examples, and therefore do not limit the scope of the appended Claims. Therefore, among the structural elements in the following exemplary embodiments, structural elements not recited in any one of the independent claims are described as arbitrary structural elements.

Embodiment 1

FIG. 1 is a block diagram of a stereoscopic image display control apparatus 10 according to Embodiment 1. The stereoscopic image display control apparatus 10 illustrated in FIG. 1 is an apparatus capable of displaying stereoscopic images (3D objects), and changing the state of the display of the stereoscopic images (3D objects) according to user operations.

It should be noted that Embodiment 1 describes a stereoscopic image display control apparatus and a stereoscopic image display control method for calculating, when a state of a stereoscopic image is changed in accordance with a user operation, the amounts of change in projection and recession of the stereoscopic image in unit time, and prevents, if the calculation results exceed a predetermined threshold value, a rapid change in the amount of projection and the amount of recession by controlling the speed at which the state of the stereoscopic image changes.

Here, the amount of projection means how far a stereoscopic image projects from the display surface of a display unit 14 in a direction toward where a user is present. The amount of recession means how far a stereoscopic image recedes from the display surface of the display unit 14 in a direction opposite to the direction toward where the user is present (depth direction).

Block Diagram of Stereoscopic Image Display Control Apparatus 10 According to Embodiment 1

In FIG. 1, the stereoscopic image display control apparatus 10 includes: an image data obtaining unit 11 which obtains stereoscopic image data to display a stereoscopic image; an input accepting unit 12 which accepts an operation (change instruction) from the user for controlling the stereoscopic image; a control unit 13 which controls the stereoscopic image to be displayed, based on the change instruction; the display unit 14 which displays the stereoscopic image using left and right eye images; and a data storage unit 15 which stores, for instance, the stereoscopic image data obtained by the image data obtaining unit 11, and indicating the stereoscopic image currently displayed by the display unit 14.

It should be noted that a "change instruction" is an instruction to change the state of a stereoscopic image displayed by the display unit 14, and includes information for directly or indirectly identifying some or all of the type of change, the amount of change, a time necessary for completing the change, a change speed, and the like. In addition, the "type of change" includes, for instance, movement, rotation, enlargement, or reduction of the stereoscopic image.

The control unit 13 includes: a change amount prediction unit 131 which predicts the amounts of change in projection and recession of a stereoscopic image in unit time to be caused in response to a change instruction accepted by the input accepting unit 12; and a display control unit 132 which controls the change speed of the state of the stereoscopic image according to at least one of the amounts of change in projection and recession in unit time predicted by the change amount prediction unit 131.

Specifically, the change amount prediction unit 131 obtains a change instruction from the input accepting unit 12, and obtains, from the data storage unit 15, data indicating the stereoscopic image displayed by the display unit 14. The change amount prediction unit 131 predicts the amounts of change in projection and recession of the stereoscopic image in unit time to be caused when the state of the stereoscopic image is changed in accordance with the change instruction. Then, if one of the amounts of change in projection and recession in unit time predicted by the change amount prediction unit 131 exceeds a predetermined threshold value, the display control unit 132 decreases the change speed of the state of the stereoscopic image such that the one of the amounts of change, in unit time, in projection and recession of the stereoscopic image to be displayed by the display unit 14 is smaller than or equal to the threshold value.

It should be noted that a specific example of the method of accepting a change instruction used by the input accepting unit 12 is not limited in particular. For example, input may be accepted through a touch operation on a touch panel disposed so as to be on the display unit 14 of the stereoscopic image display control apparatus 10, input may be accepted by the method of recognizing the movement (gesture) of a finger or a hand using a camera, an infrared sensor, a capacitive sensor, an ultrasonic sensor, a magnetic-field-detection sensor, or the like, input may be accepted from a mouse, a touchpad, or a joystick externally connected to the stereoscopic image display control apparatus 10, or input may be accepted from a remote control. In other words, any method can be used as long as the method is for accepting input from a user.

A specific example of a method of obtaining stereoscopic image data for displaying a stereoscopic image used by the image data obtaining unit 11 is not limited in particular. For example, data may be obtained from various memory (USB memory, SD card (registered trademark)), or may be obtained via a network such as a wired LAN network, a wireless LAN network, or a mobile-phone network. In other words, any method may be used as long as the method is for obtaining stereoscopic image data. In addition, it is possible to constitute the stereoscopic image display control apparatus 10 without having the image data obtaining unit 11 if stereoscopic image data is previously stored in an included memory (the data storage unit 15) or the like.

In addition, a specific example of a display method used by the display unit 14 which displays a stereoscopic image using left and right eye images is not limited in particular. For example, with the autostereoscopy method, display may be performed using parallax barrier, the lenticular method, or the integral method, for instance. Alternatively, display may be performed using the active shutter method or the frame sequential method in which glasses are used, for instance. In other words, any method can be used as long as the method is for displaying a stereoscopic image.

Ordinarily, left eye images and right eye images may be images captured by cameras placed at two different positions, computer graphics images obtained by performing, using three-dimensional computer graphics, rendering at two different viewpoints (processing performed by a computer to generate two-dimensional images in consideration of three-dimensional data and the positions of the viewpoints). In other words, any images may be used as long as a combination of left and right eye images which allows the images to be recognized as stereoscopic images.

It should be noted that the display unit 14 may not be included, rather than being included as a constituent element indispensable for the stereoscopic image display control apparatus 10 according to Embodiment 1. Specifically, the stereoscopic image display control apparatus 10 according to Embodiment 1 may be an apparatus which outputs, to an external display device, stereoscopic images (in other words, left eye images and right eye images). In that case, the stereoscopic image display control apparatus 10 further includes an output unit (omitted in the drawings) which outputs stereoscopic images to the external display device.

In addition, the data storage unit 15 is a memory which can store stereoscopic image data, the status of state transition, predicted values, the state of stereoscopic images, and the like, and from which data can be read when necessary. Although a specific example of the memory is not limited in particular, any type of memory may be utilized as long as the memory is a means capable of recording data, such as, for example, dynamic random access memory (DRAM), synchronous dynamic random access memory (SDRAM), flash memory, or ferroelectric memory.

Operation of Stereoscopic Image Display Control Apparatus 10 According to Embodiment 1

Figure 2:
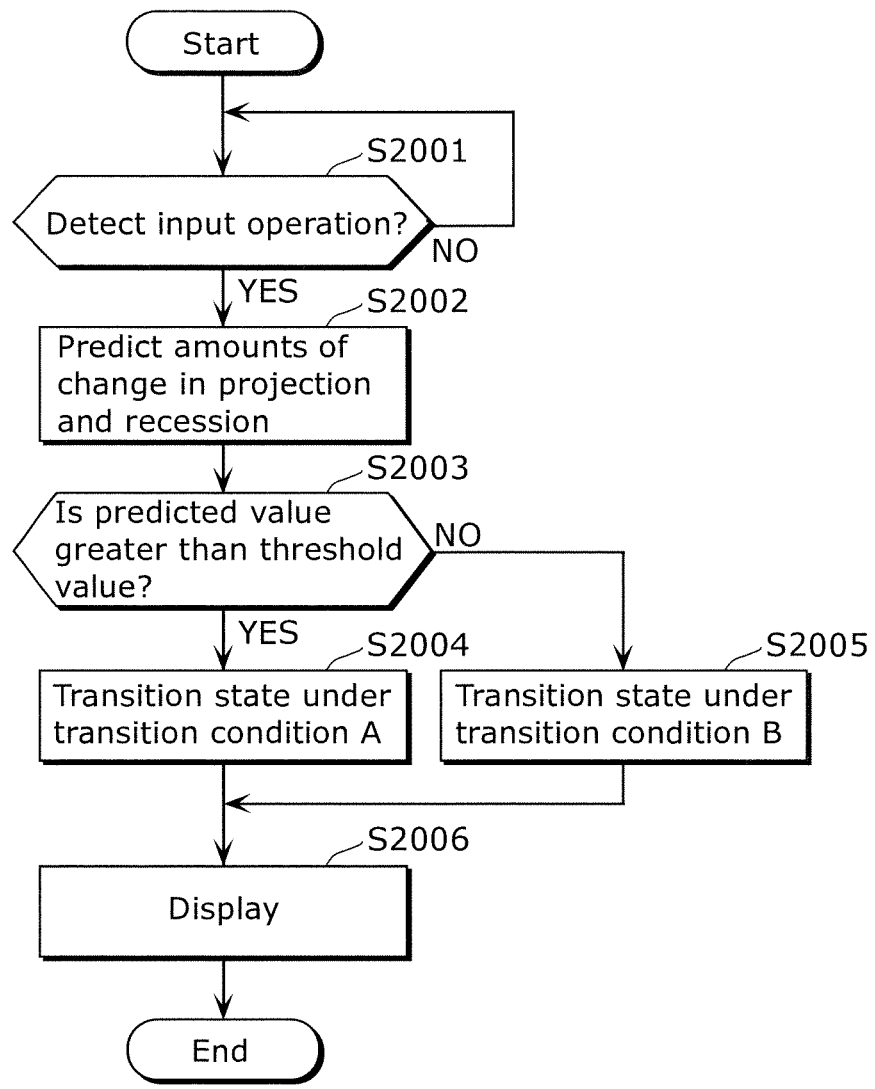
FIG. 2 is a flowchart of a stereoscopic image display control method according to Embodiment 1.

The following is a description, with reference to FIG. 2, of an example of a method for controlling a rotational speed according to Embodiment 1 by changing a time period for rotating a stereoscopic image displayed by the display unit 14, according to information indicated by a change instruction accepted by the input accepting unit 12 and the state of the stereoscopic image currently displayed by the display unit 14.

(Step S2001) If the control unit 13 detects that a change instruction from a user is accepted by the input accepting unit 12 (YES in step S2001), the processing proceeds to step S2002, whereas if the control unit 13 does not detect that (NO in step S2001), the processing returns to step S2001.

(Step S2002) Based on the change instruction accepted by the input accepting unit 12 and the state of the stereoscopic image currently displayed by the display unit 14, the change amount prediction unit 131 of the control unit 13 predicts and calculates the amounts of change in projection and recession in unit time to be caused when the state of the stereoscopic image is changed in accordance with the change instruction, and the processing proceeds to step S2003.

The change amount prediction unit 131 according to Embodiment 1 predicts, as an amount of change in projection in unit time, a difference between the amounts of projection at points of the stereoscopic image which project most from the display surface of the display unit 14 at the start and the end of the unit time. Similarly, the change amount prediction unit 131 predicts, as an amount of change in recession in unit time, a difference between the amounts of recession at points of the stereoscopic image which recede most from the display surface of the display unit 14 at the start and the end of the unit time.

(Step S2003) If at least one of the amounts of change in projection and recession in unit time predicted by the change amount prediction unit 131 exceeds a threshold value (YES in step S2003), the processing proceeds to step S2004, whereas if both the predicted amounts of change (both the amounts of change in projection and recession in unit time) are equal to or smaller than the threshold value (NO in step S2003), the processing proceeds to step S2005.

(Step S2004) The display control unit 132 controls the display content on the display unit 14 such that the state of the stereoscopic image currently displayed by the display unit 14 transitions under transition condition A, and also causes the data storage unit 15 to store the stereoscopic image data after the state has transitioned.

Here, transition condition A is a condition for controlling the rotational speed of a stereoscopic image and causing the display unit 14 to display the resultant image, to prevent a rapid change in the amount of projection and/or the amount of recession of the stereoscopic image. Specifically, the display control unit 132 rotates the stereoscopic image being displayed by the display unit 14 at a rotational speed lower than the rotational speed indicated in the change instruction. It should be noted that the following description of Embodiment 1 focuses on a method for controlling the rotational speed of a stereoscopic image displayed by the display unit 14 by changing a time period to be used for completing the rotation (by slowing down the rotation).

(Step S2005) The display control unit 132 controls the display content on the display unit 14 such that the stereoscopic image currently displayed by the display unit 14 transitions under transition conditions B, and also causes the data storage unit 15 to store the stereoscopic image data after the state has transitioned.

Here, transition condition B is a transition condition used when a rapid change in the amount of projection and/or the amount of recession of the stereoscopic image is not caused, and is a condition for not changing the rotational speed of the stereoscopic image to be displayed by the display unit 14. Thus, the display control unit 132 rotates the stereoscopic image being displayed by the display unit 14 at the rotational speed indicated in the change instruction.

(Step S2006) The display unit 14 displays a stereoscopic image using left and right eye images, based on the control of the rotational speed of the stereoscopic image by the display control unit 132 in step S2004 or S2005.

Here, when the display state is caused to transition in step S2004 or S2005, the display control unit 132 reads the state of the stereoscopic image before transition which is stored in the data storage unit 15, and causes the data storage unit 15 to again store the state of the stereoscopic image after the transition under the condition in step S2004 or S2005.

Example of Display Control of Stereoscopic Image by Stereoscopic Image Display Control Apparatus 10 According to Embodiment 1

Figure 3:
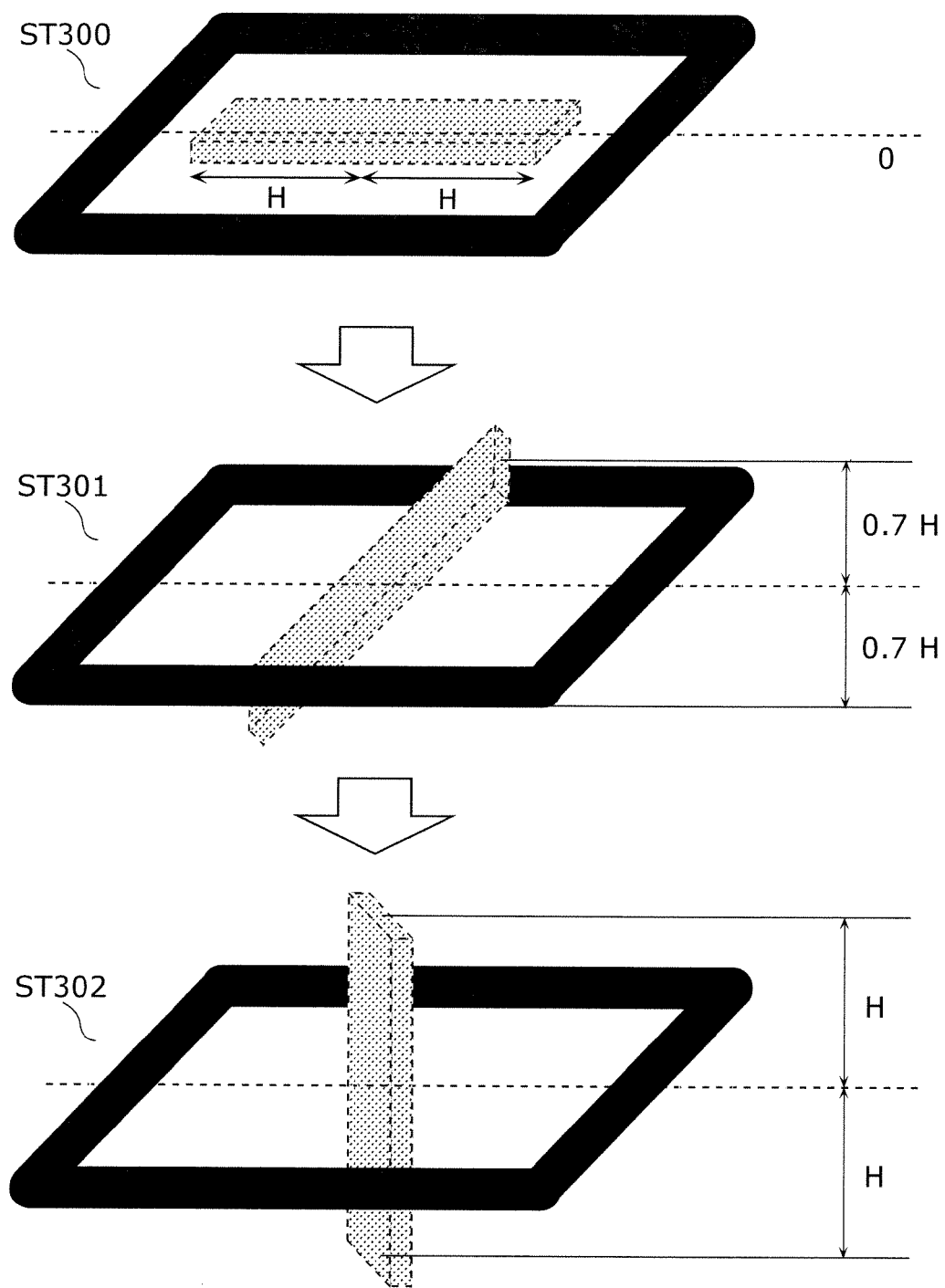
FIG. 3 is a diagram illustrating examples of rotation of a stereoscopic image displayed by a display unit.
Figure 4:
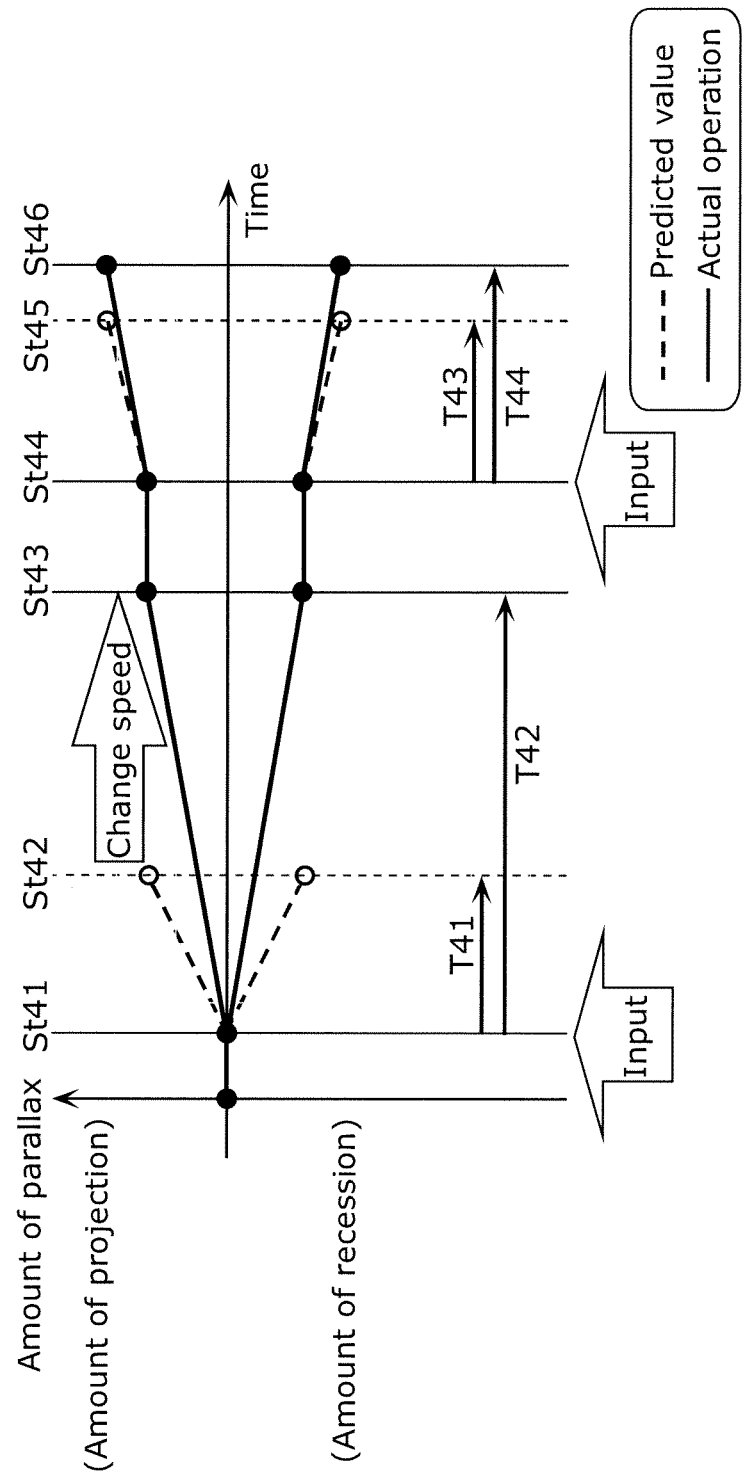
FIG. 4 is a diagram illustrating a result of controlling a rotational speed of the stereoscopic image illustrated in FIG. 3.

Next is a description, with reference to FIGS. 3 and 4, of an example of a case in which the stereoscopic image display control apparatus 10 according to Embodiment 1 controls a stereoscopic image to be displayed by the display unit 14, based on a change instruction.

In FIG. 3, a case is assumed in which the stereoscopic image display control apparatus 10 stereoscopically displays a rectangular parallelepiped, and the rectangular parallelepiped displayed by the display unit 14 rotates 45 degrees at one time in response to one user operation (e.g., a tap on the display surface of the display unit 14). Specifically, a change instruction accepted by the input accepting unit 12 in this example is an instruction to rotate the rectangular parallelepiped by 45 degrees during a predetermined time (e.g., time T41 in FIG. 4). Here, "45 degrees" correspond to the amount of change in the state of a stereoscopic image. In addition, "time T41" corresponds to a change time to be used for changing the stereoscopic image by a predetermined amount of change (45 degrees).

First, initial state ST300 in FIG. 3 shows a state in which the amount of projection at a point of the rectangular parallelepiped projecting most is "0", and the amount of recession at a point of the image receding most is "0", the rectangular parallelepiped being the stereoscopic image displayed by the display unit 14. Next, one user operation causes the rectangular parallelepiped displayed by the display unit 14 to shift from initial state ST300 to state ST301 by rotating 45 degrees. The amount of projection at the most projecting point in state ST301 is about "0.7 H", and the amount of recession at the most receding point is about "−0.7 H".

Next, another user operation causes the rectangular parallelepiped displayed by the display unit 14 to shift from state ST301 to state ST302 by further rotating 45 degrees. The amount of projection at the most projecting point in state ST302 is "H", and the amount of recession at the most receding point is "−H". Here, "H" is ½ of the length of the longest side of the rectangular parallelepiped. The rectangular parallelepiped rotates about a straight line passing its center of gravity and parallel to the shorter side of the display unit 14 (display surface).

Next is a description, with reference to FIG. 4, of a specific method of controlling the rotational speed of the stereoscopic image in each of the case in which initial state ST300 transitions to state ST301 and the case in which state ST301 transitions to state ST302, the states being illustrated in FIG. 3.

The vertical axis of FIG. 4 represents the amount of projection and the amount of recession of the stereoscopic image, and the horizontal axis represents a time period.

First, initial state ST300 in FIG. 3 corresponds to state St41 in FIG. 4 (the amount of projection at the most projecting point is "0", and the amount of recession at the most receding point is "0"). The change amount prediction unit 131 predicts the amounts of change in projection and recession in unit time to be caused when a user operation causes the rectangular parallelepiped to rotate 45 degrees from state St41 (thus, the state changes to state ST301 in FIG. 3).

Specifically, the change amount prediction unit 131 divides a difference between the amount of projection at the most projecting point in state St42 and the amount of projection at the most projecting point in state St41 by a time to be used for the rectangular parallelepiped to shift from state St41 to state St42, thereby calculating the amount of change in projection in unit time (inclination of the dashed line in FIG. 4).

Similarly, the change amount prediction unit 131 divides a difference between the amount of recession at the most receding point in state St42 and the amount of recession at the most receding point in state St41 by a time to be used for the rectangular parallelepiped to shift from state St41 to state St42, thereby calculating the amount of change in recession in unit time (inclination of the dashed line in FIG. 4).

As a result, the amount of change in projection in unit time is about "0.7 H", and the amount of change in recession in unit time is about "−0.7 H" (the amounts are calculated using time T41 as a unit time). These amounts of change both exceed a threshold value (which is 0.25 H in this example), and thus the display control unit 132 decreases the rotational speed of the rectangular parallelepiped.

It should be noted that if the amount of recession is considered in relation to the sign, "the amount of change in recession exceeds the threshold value" may be considered to mean that the absolute value of the amount of change in recession (0.7 H in the above example) exceeds the threshold value (0.25 H) or the amount of change in recession (−0.7 H in the above example) falls below the threshold value of the amount of recession (−0.25H).

Although the transition from state St41 to state St42 illustrated in FIG. 4 is based on predicted values, and shows the case in which the rectangular parallelepiped rotates 45 degrees during time T41, the variations in the amount of projection and the amount of recession in unit time will be too large if no change is made. In view of this, the rotational speed of the rectangular parallelepiped is changed (decreased) based on the predicted values such that the rectangular parallelepiped rotates 45 degrees during time T42 (longer than time T41) from state St41 to state St43.

In other words, if the rotational speed is not controlled, the rectangular parallelepiped rotates 45 degrees during time T41, and thus the amount of projection and the amount of recession change rapidly. However, the rectangular parallelepiped rotates 45 degrees during time T42 (>T41) due to the control of the rotational speed, and thus a rapid change in the amount of projection and the amount of recession can be prevented. State St43 after this transition corresponds to state ST301 in FIG. 3.

Next, a time period from state St43 to state St44 in FIG. 4 shows a time in which the display state of the rectangular parallelepiped is not changed since there is no user operation. Next, if the amounts of change in projection and recession in unit time to be caused when a user operation in state St44 causes the rectangular parallelepiped to rotate 45 degrees (specifically, the state changes to state ST302 in FIG. 3) are predicted, the amount of change in projection in unit time is about "0.3 H", and the amount of change in recession in unit time is about "−0.3 H". These amounts of change both exceed the threshold value (which is 0.25 H in this example), and thus the display control unit 132 decreases the rotational speed of the rectangular parallelepiped.

The transition from state St44 to state St45 illustrated in FIG. 4 is based on predicted values, and shows the case in which the rectangular parallelepiped rotates 45 degrees during time T43. However, variations in the amount of projection and the amount of recession in unit time will be too large if no change is made. In view of this, the rotational speed of the rectangular parallelepiped is changed (decreased) based on the predicted values such that the rectangular parallelepiped rotates 45 degrees during time T44 (longer than time T43) from state St44 to state St46.

In other words, if the rotational speed is not controlled, the rectangular parallelepiped rotates 45 degrees during time T43, and thus the amount of projection and the amount of recession change rapidly. However, the rectangular parallelepiped rotates 45 degrees during time T44 (>T43) due to the control of the rotational speed, and thus a rapid change in the amount of projection and the amount of recession can be prevented. State St46 after this transition corresponds to state ST302 in FIG. 3.

In addition, a transition from state St41 (=ST300) to state St43 (=ST301) and a transition from state St44 (=ST301) to state St46 (=ST302) result in different amounts of change in projection and recession in unit time, and thus the rotational speed, that is, a rotation time period for the same rotational amount (45 degrees) is controlled such that the rotational speeds are different during time T42 and time T44.

In the case of FIG. 4, time T42 to be used for a change from state St41 (=ST300) to state St43 (=ST301), in which the amounts of change in projection and recession in unit time are comparatively large is set so as to be longer than time T44 to be used for a change from state St44 (=ST301) to state St46 (=ST302), in which the amounts of change in projection and recession in unit time are comparatively small.

This shows that the rotational speed is adjusted according to the amounts of change in projection and recession in unit time. Specifically, when focusing on the amounts of change in projection and recession, the object rotates from state St41 to state St43 and from state St44 to state St46 at the same speed (thus, the inclinations of the solid lines in FIG. 4 are the same). However, when focusing on the amount of rotation (angle of rotation), the object rotates more slowly (i.e., taking a longer time) from state St41 to state St43, than from state St44 to state St46.

Figure 5:
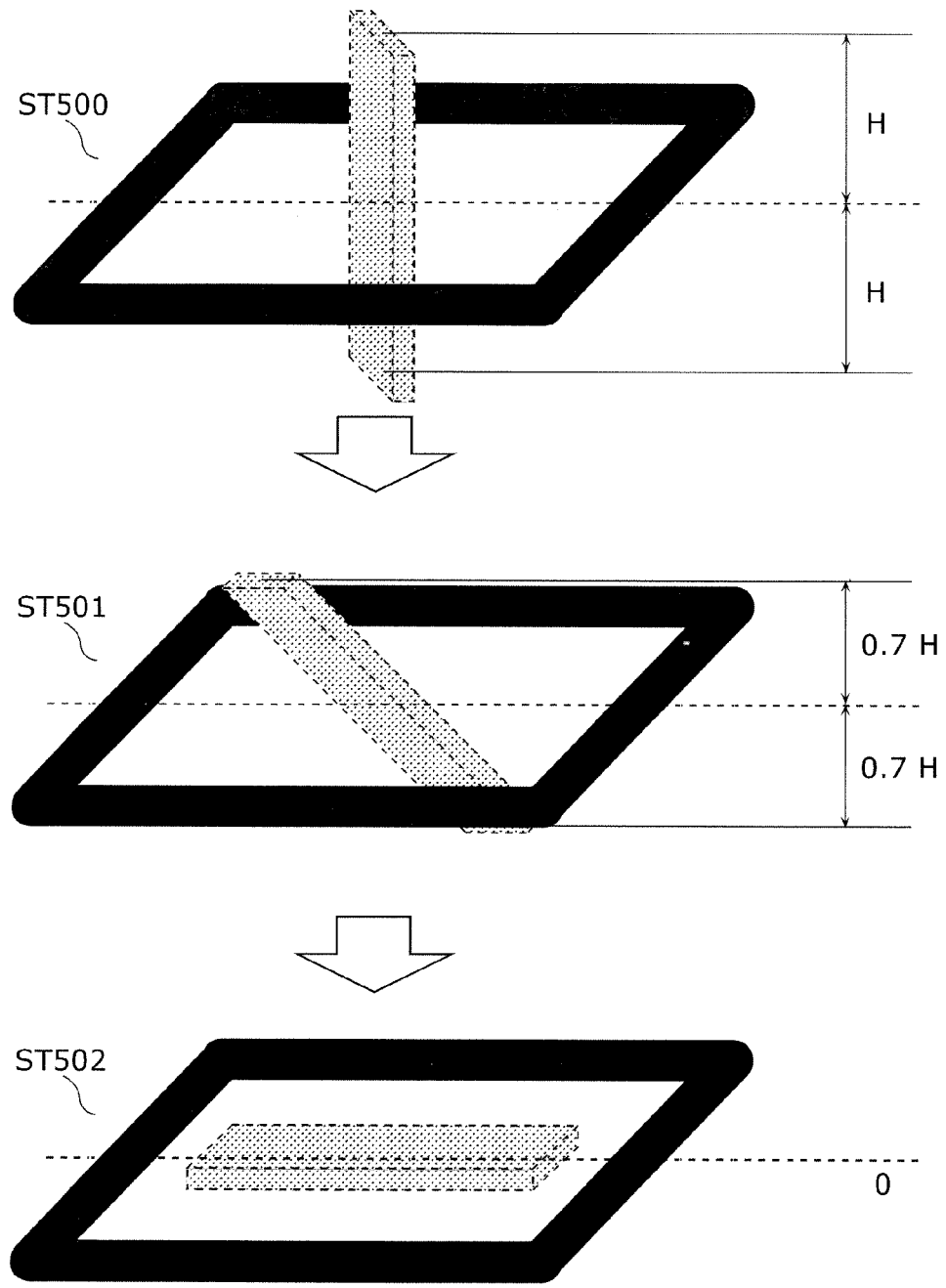
FIG. 5 is a diagram illustrating other examples of rotation of the stereoscopic image displayed by the display unit.
Figure 6:
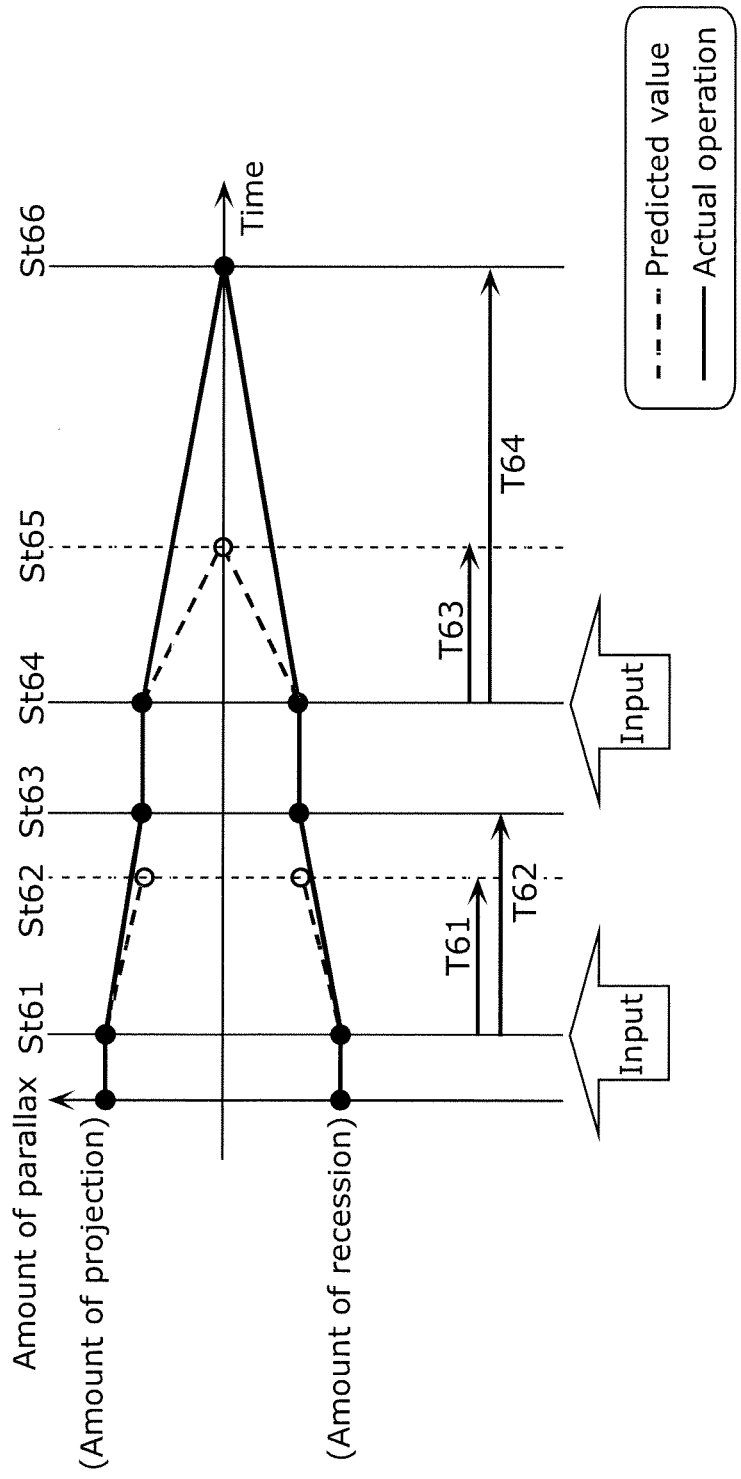
FIG. 6 is a diagram illustrating a result of controlling a rotational speed of the stereoscopic image illustrated in FIG. 5.

FIGS. 5 and 6 illustrate the case in which the rectangular parallelepiped in state ST302 in FIG. 3 is further rotated in response to still more operations to the rectangular parallelepiped.

State ST500 in FIG. 5 corresponds to state ST302 in FIG. 3. It should be noted that the case in FIG. 5 is assumed in which the rectangular parallelepiped rotates 45 degrees at one time in response to one user operation, as with the case of FIG. 3.

First, in state ST500, the amount of projection at a point of the rectangular parallelepiped projecting most is "H", and the amount of recession at a point of the rectangular parallelepiped receding most is "−H", the rectangular parallelepiped being displayed by the display unit 14. Next, one user operation causes the rectangular parallelepiped displayed by the display unit 14 to shift from state ST500 to state ST501 by rotating 45 degrees. The amount of projection at the most projecting point in state ST501 is about "0.7 H", and the amount of recession at the most receding point is about "−0.7 H".

Next, another user operation causes the rectangular parallelepiped displayed by the display unit 14 to shift from state ST501 to state ST502 by further rotating 45 degrees. The amount of projection at the most projecting point in state ST502 is "0", and the amount of recession at the most receding point is "0".

Next is a description, with reference to FIG. 6, of a specific method of controlling the rotational speed of the stereoscopic image in each of the case in which state ST500 transitions to state ST501 and the case in which state ST501 transitions to state ST502, the states being illustrated in FIG. 5.

The vertical axis in FIG. 6 represents the amount of projection and the amount of recession of a stereoscopic image, and the horizontal axis represents a time period.

First, state ST500 in FIG. 5 corresponds to state St61 in FIG. 6 (the amount of projection at the most projecting point is "H", and the amount of recession at the most receding point is "−H"). If the amounts of change in projection and recession in unit time to be caused when the rectangular parallelepiped rotates 45 degrees from state ST500 in response to a user operation (that is, its state changes to state ST501 in FIG. 5) are predicted, the amount of change in projection in unit time is about "0.3 H", and the amount of change in recession in unit time is about "−0.3 H". These amounts of change both exceed a threshold value (which is 0.25 H in this example), and thus the display control unit 132 decreases the rotational speed of the rectangular parallelepiped.

The transition from state St61 to state St62 illustrated in FIG. 6 is based on predicted values, and shows the case in which the rectangular parallelepiped rotates 45 degrees during time T61. However, variations in the amount of projection and the amount of recession in unit time will be too large if no change is made. In view of this, the rotational speed of the rectangular parallelepiped is changed (decreased) based on the predicted values such that the rectangular parallelepiped rotates 45 degrees during time T62 (longer than time T61) from state St63 to state St62.

In other words, if the rotational speed is not controlled, the rectangular parallelepiped rotates 45 degrees during time T61, and thus the amount of projection and the amount of recession change rapidly. However, the rectangular parallelepiped rotates 45 degrees during time T62 (>T61) due to the control of the rotational speed, and thus a rapid change in the amount of projection and the amount of recession can be prevented. State St63 after this transition corresponds to state ST501 in FIG. 5.

Next, a time period from state St63 to state St64 in FIG. 6 shows a time when the state of the rectangular parallelepiped is not changed since there is no user operation. Next, if the amounts of change in projection and recession in unit time to be caused when a user operation in state St64 causes the rectangular parallelepiped to rotate 45 degrees (specifically, the state changes to state ST502 in FIG. 5) are predicted, the amount of change in projection in unit time is about "0.7 H", and the amount of change in recession in unit time is about "−0.7 H". These amounts of change both exceed the threshold value (which is 0.25 H in this example), and thus the display control unit 132 decreases the rotational speed of the rectangular parallelepiped.

The transition from state St64 to state St65 illustrated in FIG. 6 is based on predicted values, and shows the case in which the rectangular parallelepiped rotates 45 degrees during time T63. However, variations in the amount of projection and the amount of recession in unit time will be too large if no change is made. In view of this, the rotational speed of the rectangular parallelepiped is changed (decreased) based on the predicted values such that the rectangular parallelepiped rotates 45 degrees during time T64 (longer than time T63) from state St64 to state St66.

In other words, if the rotational speed is not controlled, the rectangular parallelepiped rotates 45 degrees during time T63, and thus the amount of projection and the amount of recession change rapidly. However, the stereoscopic image rotates 45 degrees during time T64 (>T63) due to the control of the rotational speed, and thus a rapid change in the amount of projection and the amount of recession can be prevented. State St66 after this transition corresponds to state ST502 in FIG. 5.

In addition, a transition from state St61 (=ST500) to state St63 (=ST501) and a transition from state St64 (=ST501) to state St66 (=ST502) result in different amounts of change in projection and recession in unit time, and thus the rotational speed, that is, a rotation time period for the same rotational amount, or specifically, 45 degrees is controlled such that the rotational speeds are different in time T62 and time T64. This shows that the rotational speed is adjusted according to the amounts of change in projection and recession in unit time.

The above examples described with reference to FIGS. 3 to 6 all show the case of state transition under transition condition A in step S2004 in FIG. 2.

Figure 7:
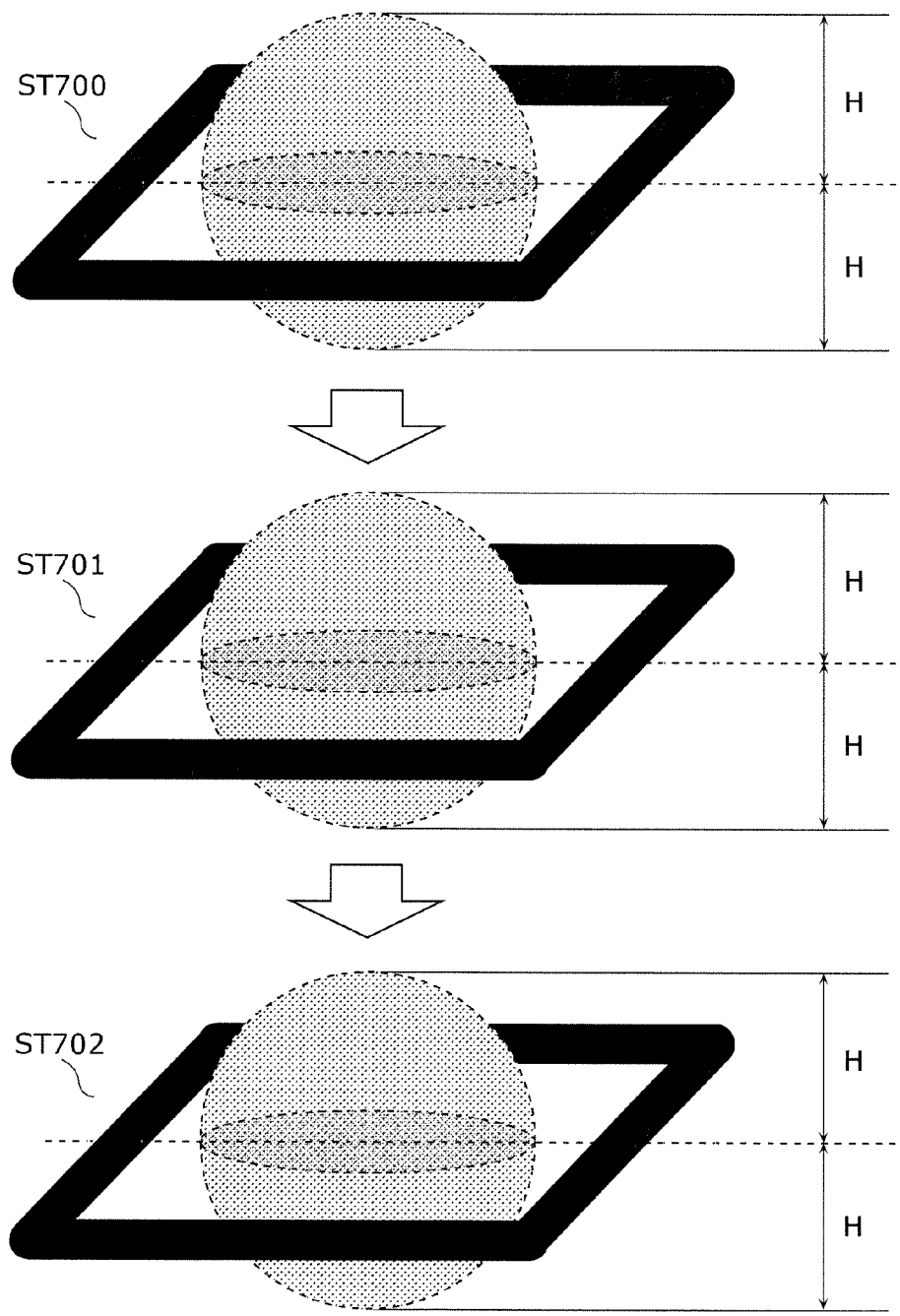
FIG. 7 is a diagram illustrating other examples of rotation of a stereoscopic image displayed by the display unit.
Figure 8:
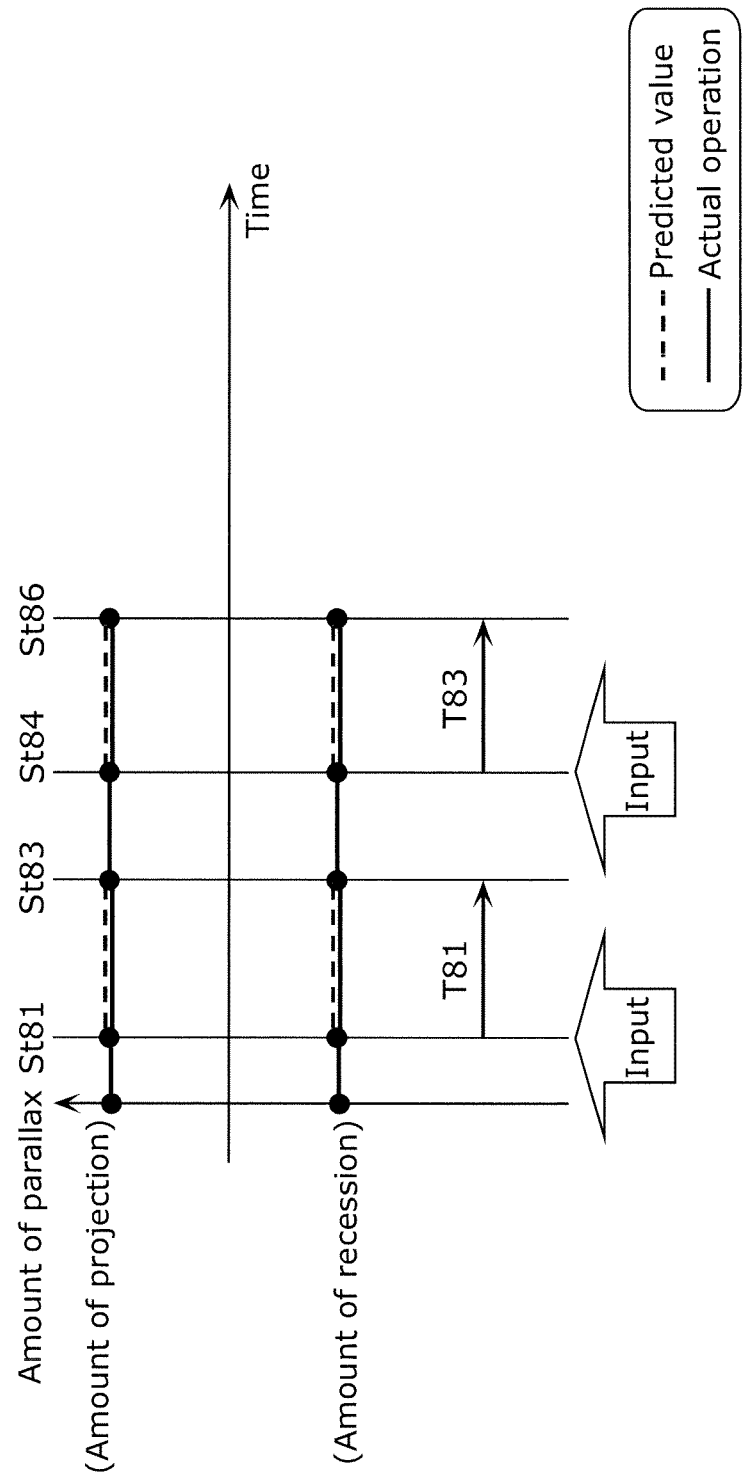
FIG. 8 is a diagram illustrating a result of controlling a rotational speed of the stereoscopic image illustrated in FIG. 7.

A description with reference to FIGS. 7 and 8 is now given of another example of the case in which the stereoscopic image display control apparatus 10 according Embodiment 1 controls a stereoscopic image displayed by the display unit 14, based on a change instruction from a user.

In FIG. 7, the case is assumed in which a spherical object is stereoscopically displayed by the stereoscopic image display control apparatus 10, and the sphere rotates about its center of gravity by 45 degrees at one time in response to one user operation. First, initial state ST700 shows a state in which the amount of projection at a point of the sphere projecting most is "H", and the amount of recession at a point of the sphere receding most is "−H", the sphere being displayed by the display unit 14.

Next, one user operation causes the sphere displayed by the display unit 14 to shift from initial state ST700 to state ST701 by rotating 45 degrees. The amount of projection at the most projecting point in state ST701 is "H", and the amount of recession at the most receding point is "−H". Thus, the amounts are the same as those in initial state ST700.

Next, another user operation causes the sphere displayed by the display unit 14 to shift from state ST701 to state ST702 by further rotating 45 degrees. The amount of projection at the most projecting point in state ST702 is "H", and the amount of recession at the most receding point is "−H". Thus, the amounts are the same as those in state ST701.

Next is a description with reference to FIG. 8 of a specific method of controlling the rotational speed of the stereoscopic image in each of the case in which initial state ST700 transitions to state ST701 and the case in which state ST701 transitions to state ST702, the states being illustrated in FIG. 7.

The vertical axis in FIG. 8 represents the amount of projection and the amount of recession of a stereoscopic image, and the horizontal axis represents a time period.

First, initial state ST700 in FIG. 7 corresponds to state St81 in FIG. 8 (the amount of projection at the most projecting point is "H", and the amount of recession at the most receding point is "−H"). If the amounts of change in projection and recession in unit time to be caused when the sphere rotates 45 degrees from state St81 (I.e., its state changes to state ST701 in FIG. 7) in response to a user operation are predicted, the amount of change in projection in unit time is "0", and the amount of change in recession in unit time is "0".

Thus, the amount of projection and the amount of recession do not change, and both do not exceed a threshold value (which is 0.25 H in this example), and thus the display control unit 132 does not change the rotational speed of the sphere. Accordingly, the display control unit 132 rotates the sphere displayed by the display unit 14 in accordance with a change instruction accepted by the input accepting unit 12.

The transition from state St81 to state St83 illustrated in FIG. 8 is based on predicted values, and shows the case in which the sphere rotates 45 degrees during time T81. However, changes in the amount of projection and the amount of recession in unit time is small (no change is caused in this example). Accordingly, based on this predicted value, the display control unit 132 causes the display unit 14 to display the sphere without changing the rotational speed of thereof such that state St81 transitions to state St83. This means that if there is no rapid change in the amount of projection and the amount of recession, a user operation is reflected on the display as it instructs, rather than changing the rotational speed of the sphere. State St83 after this transition corresponds to state ST701 in FIG. 7.

A time period from state St83 to state St84 shows a time when the display state of the sphere is not changed since there is no user operation. Next, if the amounts of change in projection and recession in unit time to be caused when a user operation in state St84 causes the sphere to rotate 45 degrees (specifically, the state changes to state ST702 in FIG. 7) are predicted, the amount of change in projection in unit time is "0", and the amount of change in recession in unit time is "0". Both of these amounts of change do not exceed the threshold value (which is 0.25 H in this example), and thus the display control unit 132 causes the display unit 14 to display the sphere without changing the rotational speed of the sphere.

The transition from state St84 to state St86 illustrated in FIG. 8 is based on predicted values, and shows the case in which the sphere rotates 45 degrees during time T83. However, changes in the amount of projection and the amount of recession in unit time are small (no change is caused in this example). Accordingly, based on the predicted values, the display control unit 132 causes the display unit 14 to display the sphere without changing the rotational speed of the sphere such that state St84 transitions to state St86. State St86 after this transition corresponds to state ST702 in FIG. 7.

The example illustrated in FIGS. 7 and 8 shows a case of a display without changing the rotational speed, or specifically, the case of state transition under transition condition B in step S2005 in FIG. 2, since there is no rapid change in the amount of projection and the amount of recession (there is no change in this example).

In the above manner, a stereoscopic image can be rotated in accordance with a user operation while maintaining the size and shape of the stereoscopic image itself fixed. When the stereoscopic image is to be rotated in response to an operation, the rotational speed of the stereoscopic image is decreased if at least one of the amounts of change in projection and recession of the stereoscopic image in unit time exceeds a predetermined threshold value. As a result, a rapid change in the amount of projection and the amount of recession can be prevented, thereby achieving effects of reducing the fatigue of a viewer.

Embodiment 2

Embodiment 1 describes, with reference to FIGS. 2 to 8, an example in which if at least one of the amounts of change in projection and recession of a stereoscopic image in unit time exceeds a predetermined threshold value when the stereoscopic image is rotated in response to a user operation, the stereoscopic image is rotated by a given amount of rotation indicated in a change instruction, taking a time longer than the rotation time indicated in the change instruction, in order to decrease the rotational speed of the stereoscopic image.

Figure 9:
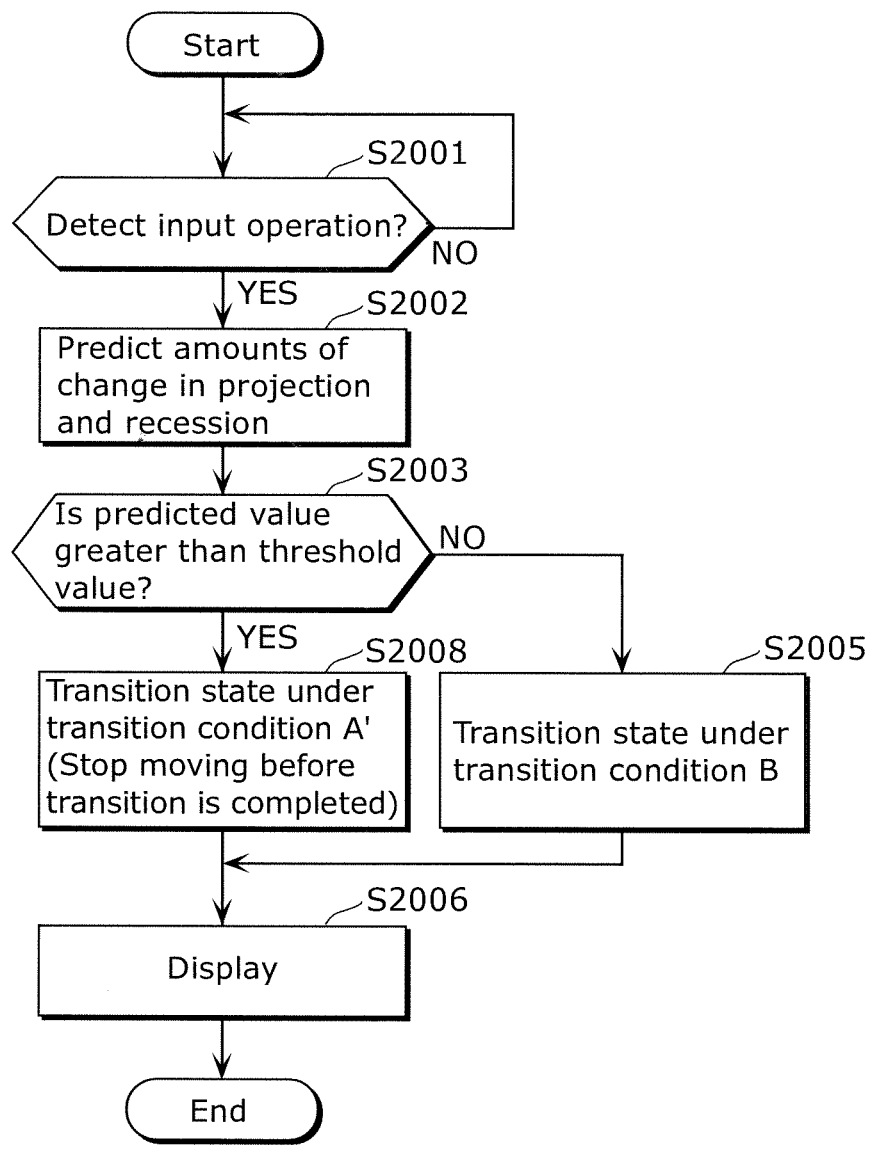
FIG. 9 is a flowchart of a stereoscopic image display control method according to Embodiment 2.
Figure 10:
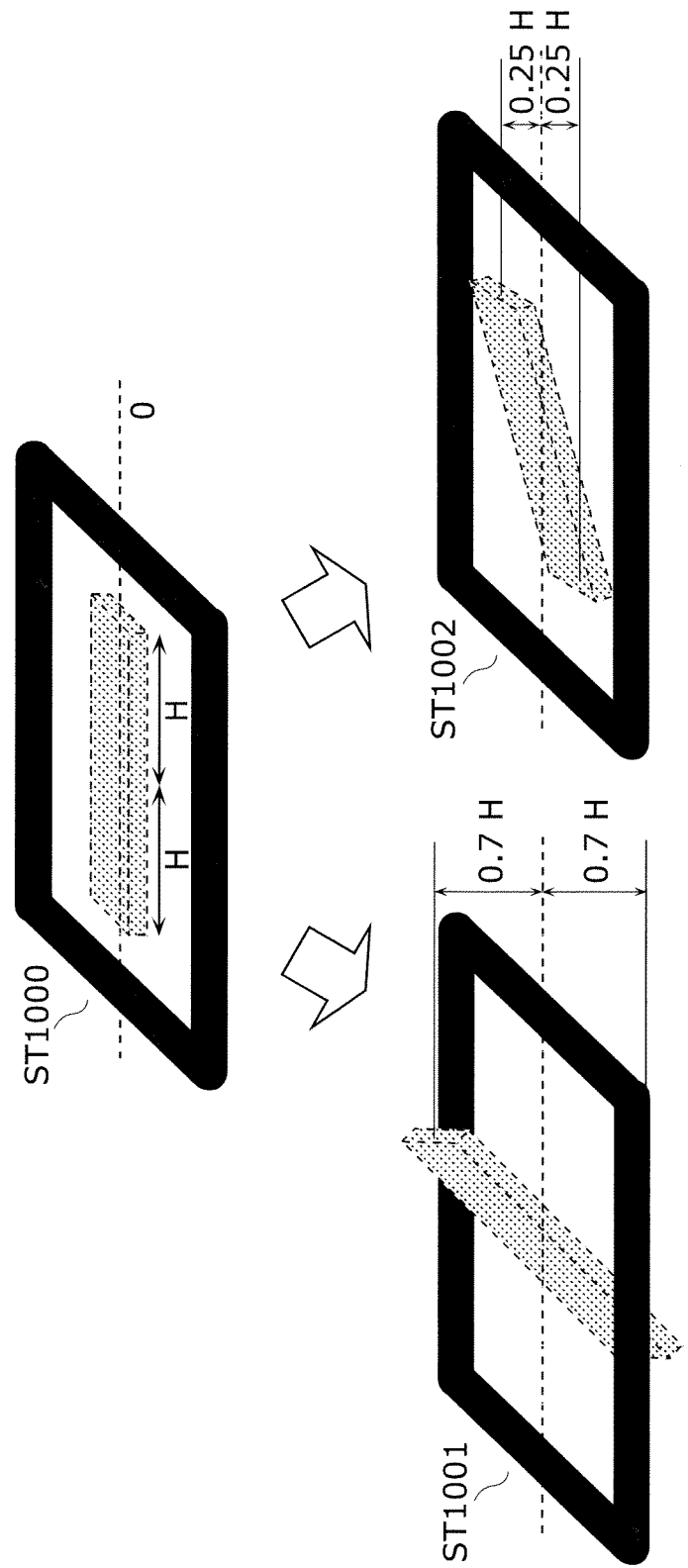
FIG. 10 is a diagram illustrating examples of rotation of a stereoscopic image displayed by the display unit.
Figure 11:
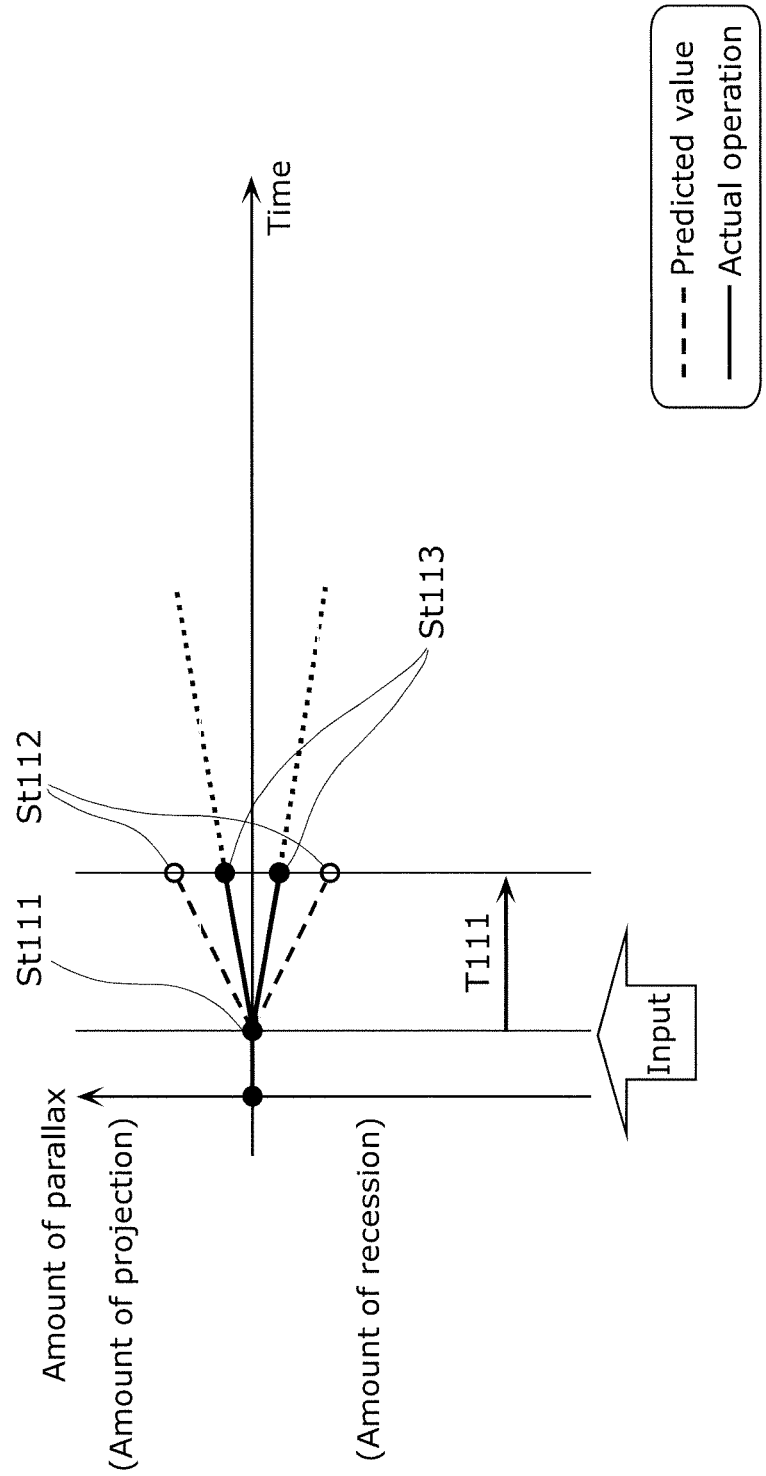
FIG. 11 is a diagram illustrating a result of controlling a rotational speed of the stereoscopic image illustrated in FIG. 10.

In contrast, Embodiment 2 describes, with reference to FIGS. 9 to 11, an example in which if at least one of the amounts of change in projection and recession of a stereoscopic image in unit time exceeds a predetermined threshold value when the stereoscopic image is rotated in response to a user operation, the stereoscopic image is rotated by a smaller rotation amount than normal, taking a given time period, in order to decrease the rotational speed of the stereoscopic image.

It should be noted that the configuration of a stereoscopic image display control apparatus 10 according to Embodiment 2 illustrated in FIG. 1 is the same as that in Embodiment 1, and thus a description thereof is omitted here. A detailed description of other points common to Embodiment 1 is also omitted, and a description is mainly given on the differences.

Operation of Stereoscopic Image Display Control Apparatus 10 According to Embodiment 2

The following is a description, with reference to FIG. 9, of a method according to Embodiment 2 for controlling a rotational speed by changing the amount of rotation of a stereoscopic image displayed by a display unit 14 according to information of a change instruction accepted by an input accepting unit 12 and the state of a stereoscopic image currently displayed. It should be noted that in Embodiment 2, step S2004 described with reference to FIG. 2 is replaced with step S2008 in FIG. 9, and the amount of rotation is controlled.

(Step S2001) If a control unit 13 detects that a change instruction from a user has been accepted by the input accepting unit 12 (YES in step S2001), the processing proceeds to step S2002, whereas if the control unit 13 does not detect that (NO in step S2001), the processing returns to step S2001.

(Step S2002) Based on the change instruction accepted by the input accepting unit 12 and the state of a stereoscopic image currently displayed by the display unit 14, a change amount prediction unit 131 predicts the amounts of change in projection and recession in unit time to be caused when the state of the stereoscopic image is changed in accordance with the change instruction, and the processing proceeds to step S2003.

(Step S2003) If at least one of the amounts of change in projection and recession in unit time predicted by the change amount prediction unit 131 exceeds a threshold value (YES in step S2003), the processing proceeds to step S2008, and if both the predicted amounts of change (both the amounts of change in projection and recession in unit time) do not exceed the threshold value (NO in step S2003), the processing proceeds to step S2005.

(Step S2008) A display control unit 132 controls the display content on the display unit 14 such that the state of the stereoscopic image currently displayed by the display unit 14 transitions under transition condition A', and also causes a data storage unit 15 to store the stereoscopic image data after the state has transitioned.

Here, transition condition A' is a condition for controlling the display speed (rotational speed) of a stereoscopic image in order to prevent a rapid change in the amounts of projection and recession of the stereoscopic image, and causing the display unit 14 to display the image. It should be noted that the following description of Embodiment 2 focuses on a method for controlling the rotational speed of a stereoscopic image by changing the amount of rotation (by decreasing the amount of rotation) made during a given time period indicated in a change instruction.

(Step S2005) The display control unit 132 controls the display content on the display unit 14 such that the state of the stereoscopic image currently displayed by the display unit 14 transitions under transition condition B, and also causes the data storage unit 15 to store the stereoscopic image data after the state has transitioned.

Here, transition condition B is a transition condition used when there is no rapid change in the amount of projection and the amount of recession of the stereoscopic image, and is a condition for not changing the amount of rotation of the stereoscopic image (rotating the image at the rotational speed indicated in a change instruction).

(Step S2006) The display unit 14 displays a stereoscopic image using left and right eye images, based on the control of the amount of rotation of the stereoscopic image by the display control unit 132 in step S2008 or S2005.

Here, when causing the display state to transition in step S2008 or S2005, the display control unit 132 reads the state of the stereoscopic image before transition which is stored in the data storage unit 15, and causes the data storage unit 15 again to store the state of the stereoscopic image which has transitioned under the condition in step S2008 or S2005.

Example of Display Control of Stereoscopic Image by Stereoscopic Image Display Control Apparatus 10 According to Embodiment 2

A description is given, with reference to FIGS. 10 and 11, of an example of the case in which the stereoscopic image display control apparatus 10 according to Embodiment 2 controls a stereoscopic image displayed by the display unit 14, based on a change instruction.

In FIG. 10A, a case is assumed in which the stereoscopic image display control apparatus 10 stereoscopically displays a rectangular parallelepiped, and the rectangular parallelepiped displayed by the display unit 14 rotates by the amount of rotation determined according to the change in the amounts of projection and recession in response to one user operation, and rotates 45 degrees if the amounts of change in unit time do not exceed a threshold value.

First, initial state ST1000 shows a state in which the amount of projection at a point of the rectangular parallelepiped projecting most is "0", and the amount of recession at a point of the rectangular parallelepiped receding most is "0", the rectangular parallelepiped being displayed by the display unit 14. Next, state ST1001 is a state in which the rectangular parallelepiped is rotated 45 degrees from initial state ST1000 in response to one user operation so as to prevent a rapid change in the amount of projection and the amount of recession. The amount of projection at the most projecting point in state ST1001 is "0.7 H", and the amount of recession at the most receding point is "−0.7 H".

Next is a description, with reference to FIG. 11, of a specific method for controlling the amount of rotation of a stereoscopic image to be caused when initial state ST1000 illustrated in FIG. 10 transitions to state ST1001.

The vertical axis in FIG. 11 represents the amount of projection and the amount of recession of a stereoscopic image, and the horizontal axis represents a time period.

First, initial state ST1000 in FIG. 10 corresponds to state Still in FIG. 11 (the amount of projection at the most projecting point is "0", and the amount of recession at the most receding point is "0"). If the amounts of change in projection and recession in unit time to be caused when a user operation causes the rectangular parallelepiped to rotate 45 degrees from state Still (specifically, its state changes to state ST1001 in FIG. 10) are predicted, the amount of change in projection in unit time is about "0.7 H", and the amount of change in recession in unit time is about "−0.7 H". These amounts of change both exceed a threshold value (which is 0.25 H in this example), and thus the display control unit 132 decreases the rotational speed of the rectangular parallelepiped.

The transition from state Still to state St112 illustrated in FIG. 11 is based on predicted values, and shows the case in which the rectangular parallelepiped rotates 45 degrees during time T111 (which corresponds to state ST1001 in FIG. 10). However, variations in the amount of projection and the amount of recession in unit time will be too large if no change is made. In view of this, the amount of rotation of the rectangular parallelepiped during time T111 from state St111 to state St113 is decreased based on the predicted values. As a result, the rotational speed of the rectangular parallelepiped is lower than the rotational speed indicated in a change instruction.

In other words, a time period for transition from state Still to state St112 and a time period for transition from state Still to state St113 are both the same, namely, time T111. However, the rectangular parallelepiped rotates 45 degrees through the transition from state St111 to state St112, whereas the rectangular parallelepiped rotates only by an angle smaller than 45 degrees (e.g., 30 degrees) through the transition from state St111 to state St113. State St43 after this transition corresponds to state ST1002 in FIG. 10.

In this manner, the rotational speed of the rectangular parallelepiped can also be decreased by reducing the amount of rotation of the rectangular parallelepiped during the same time period. Thus, a rapid change in the amounts of projection and recession can also be prevented by such control. Therefore, a user may input an instruction for rotating the stereoscopic image several times, in order to rotate the stereoscopic image by a given angle (45 degrees).

This shows that the rotational speed of a rectangular parallelepiped is adjusted according to the amounts of change in projection and recession in unit time, and that the state transitions under transition condition A' in step S2008 in FIG. 9. It should be noted that if both changes in the amounts of projection and recession in unit time do not exceed the threshold value, the display unit 14 is caused to display a stereoscopic image without changing the amount of rotation (and rotational speed) of the stereoscopic image (which corresponds to step S2005 of FIG. 9) although a description thereof is omitted in Embodiment 2.

In the above manner, a stereoscopic image can be rotated in accordance with a user operation while maintaining the size and shape of the stereoscopic image itself fixed. When a stereoscopic image is to be rotated in response to a user operation, the amount of rotation made during a predetermined time period is decreased if at least one of the amounts of change in projection and recession of a stereoscopic image in unit time exceeds a predetermined threshold value. As a result, a rapid change in the amount of projection and the amount of recession can be prevented, thereby achieving effects of reducing the fatigue of a viewer.

Embodiment 3

Embodiments 1 and 2 describe the stereoscopic image display control apparatus 10 which changes the display of a stereoscopic image (3D object) in accordance with a user operation. In addition, Embodiments 1 and 2 give descriptions assuming that a stereoscopic image is rotated by 45 degrees in response to one user operation.

In contrast, Embodiment 3 handles the case in which the amount of rotation is continuously changed according to the actual amount of user operation. Furthermore, a description is given, with reference to FIG. 12, of a stereoscopic image display control apparatus 20 which prevents, when a stereoscopic image is rotated, a rapid change in the amounts of projection and recession by decreasing the rotational speed of the stereoscopic image if at least one of the amounts of change in projection and recession of the stereoscopic image in unit time exceeds a predetermined threshold value.

Configuration of Stereoscopic Image Display Control Apparatus 20 According to Embodiment 3

Figure 12:
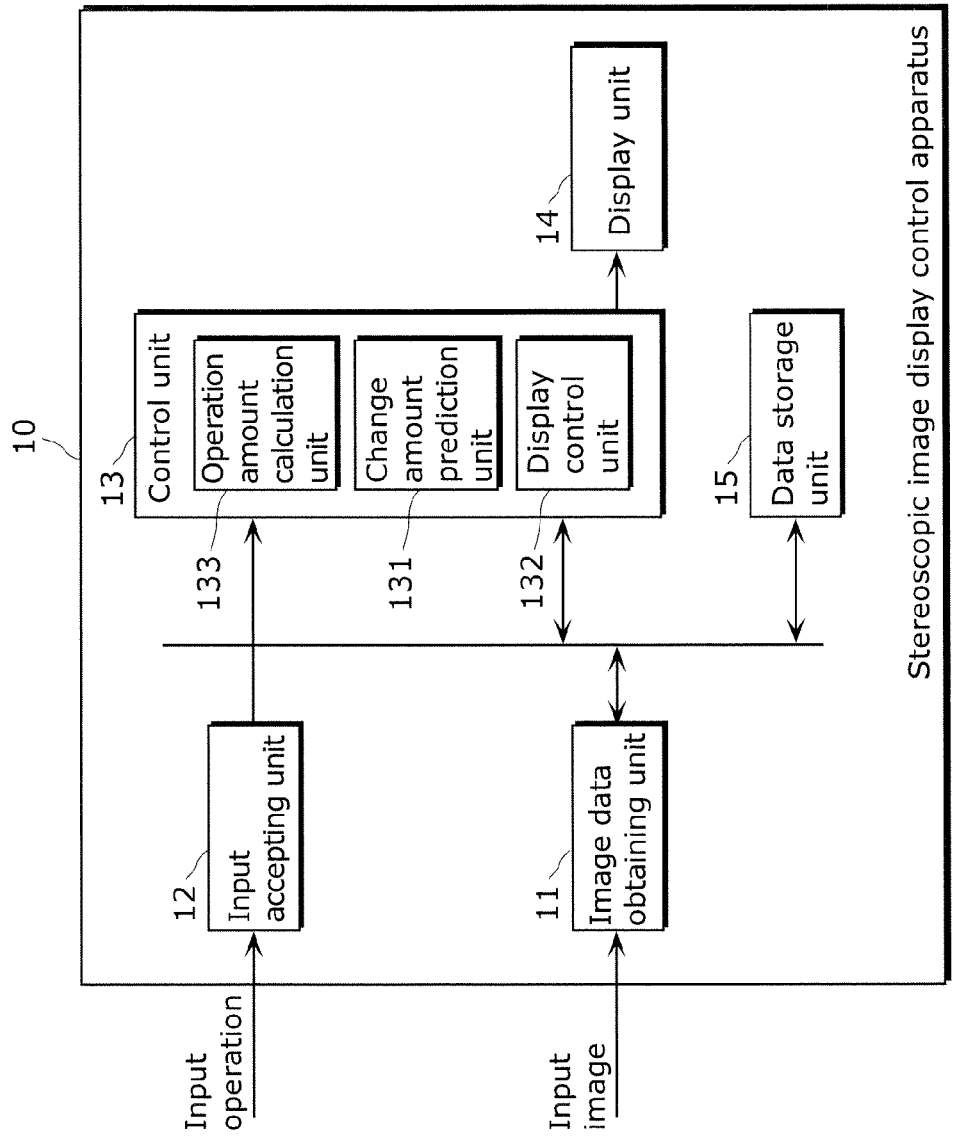
FIG. 12 is a block diagram of a stereoscopic image display control apparatus according to Embodiment 3.

FIG. 12 is a block diagram illustrating the outline of the stereoscopic image display control apparatus 20 according to Embodiment 3. It should be noted that the portion having the similar configuration as that of the stereoscopic image display control apparatus 10 according to Embodiment 1 is given the same numeral, and a description thereof is omitted. In addition, a detailed description of points common to Embodiments 1 and 2 is omitted, and a description is given focusing on different points.

In FIG. 12, the stereoscopic image display control apparatus 20 according to Embodiment 3 has a configuration in which a control unit 13 includes an operation amount calculation unit 133, in addition to the configuration of the stereoscopic image display control apparatus 10 according to Embodiment 1. The operation amount calculation unit 133 calculates the amount of rotation, based on the amount of user operation accepted by an input accepting unit 12. Accordingly, the amount of user operation is included in a change instruction according to Embodiment 3. Also, the "amount of user operation" is information for indirectly identifying the amount of rotation (amount of change).

A specific example of a method used by the operation amount calculation unit 133 to calculate the amount of rotation is not particularly limited. For example, when a touch operation to a touch panel disposed so as to be on a display unit 14 of the stereoscopic image display control apparatus 20 is accepted, it is possible to adopt a configuration in which the faster the speed is at which an operation is performed on the touch panel, the greater the amount of rotation is, whereas the lower the speed is at which an operation is performed, the smaller the amount of rotation is. Furthermore, it is possible to adopt another configuration, as a different example, in which the longer the length is along which an operation is performed on the touch panel, the greater the amount of rotation is, whereas the shorter the length is along which an operation is performed on the touch panel, the smaller the amount of rotation is. In addition, when a button of a mouse, a joystick, or the like is operated, the amount of rotation may be changed according to the time period in which the button is pressed, for instance (e.g., the longer the pressing time is, the greater the amount of rotation is, whereas the shorter the pressing time is, the smaller the amount of rotation is). In other words, any method may be used as long as the method is for calculating the amount of rotation, based on the actual amount of user operation.

In addition, not only the amount of rotation, but also a time period to be used for rotating an object by the amount of rotation calculated as described above (rotation time) and the rotational speed, for instance, may be calculated based on the actual amount of user operation. For example, it is possible to adopt a configuration in which the faster the speed is at which an operation is performed on a touch panel, the shorter a rotation time is (the faster the rotational speed is), whereas the lower the speed is at which an operation is performed on a touch panel, the longer a rotation time is (the lower the rotational speed is).

A change amount prediction unit 131 is notified of the amount of rotation calculated by the operation amount calculation unit 133. The change amount prediction unit 131 predicts the amounts of change in projection and recession of a stereoscopic image in unit time, according to the amount of rotation obtained from the operation amount calculation unit 133.

Operation of Stereoscopic Image Display Control Apparatus 20 According to Embodiment 3

Figure 13:
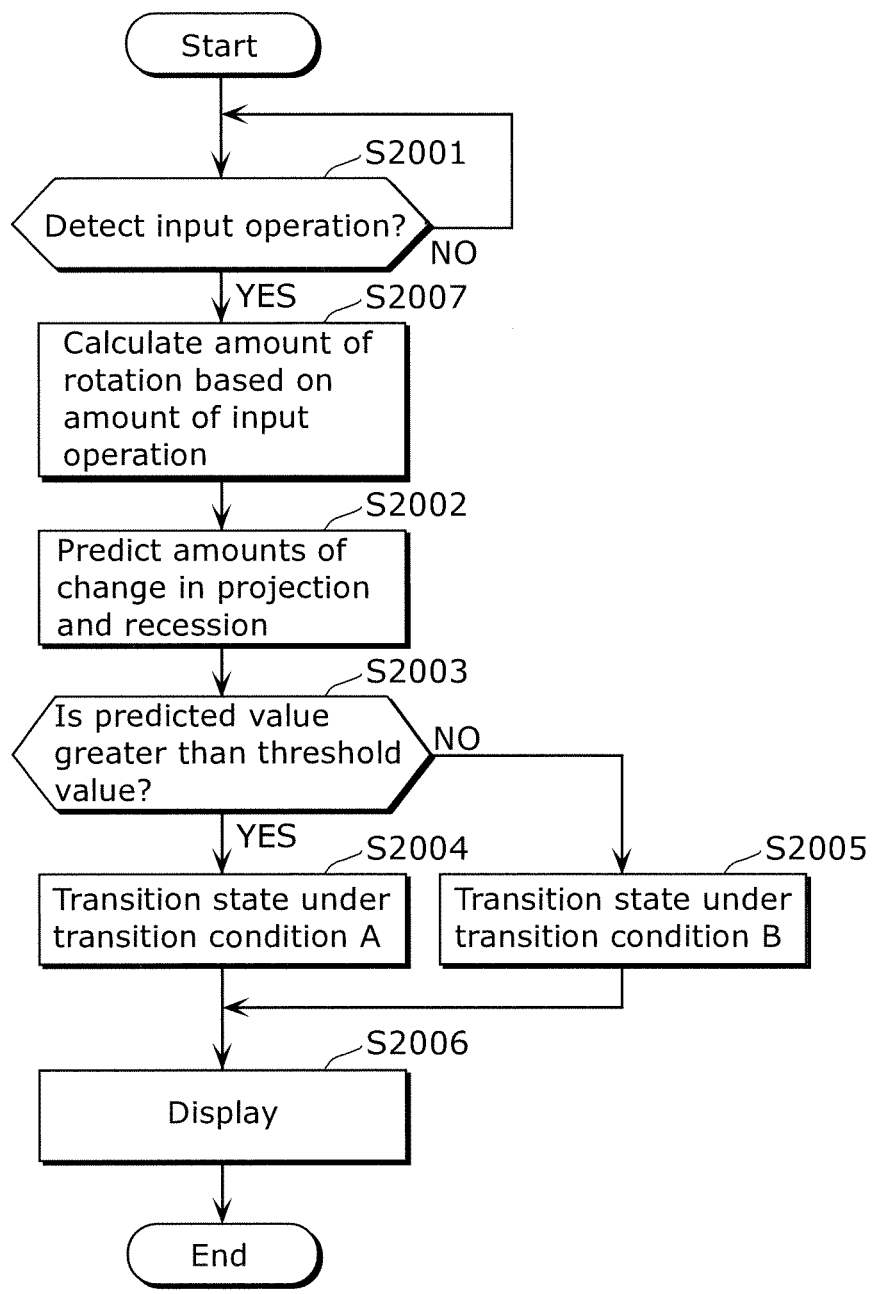
FIG. 13 is a flowchart of a stereoscopic image display control method according to Embodiment 3 in correspondence with FIG. 2.
Figure 14:
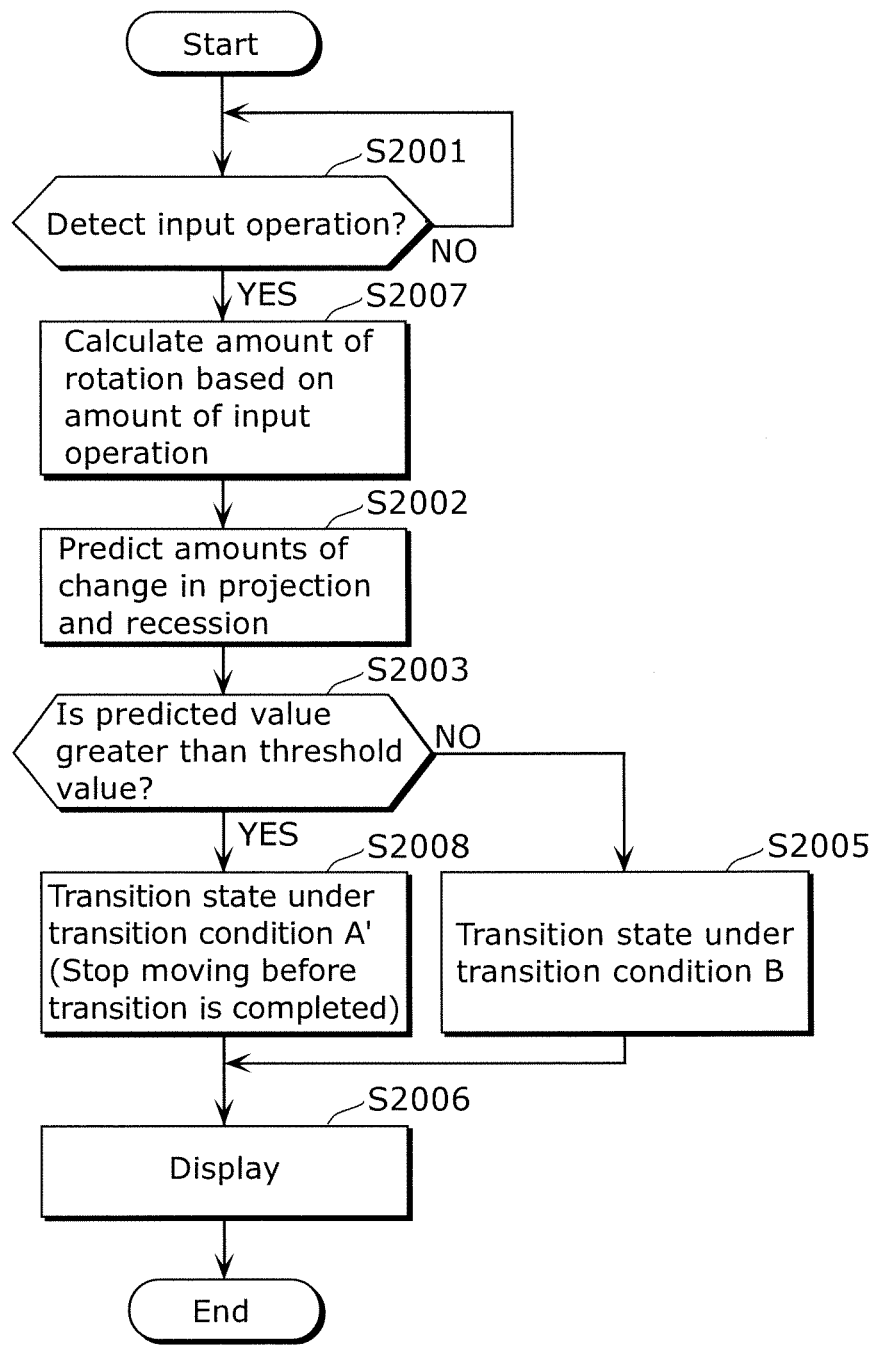
FIG. 14 is a flowchart of the stereoscopic image display control method according to Embodiment 3 in correspondence with FIG. 9.

FIGS. 13 and 14 are diagrams illustrating examples of a control operation on a stereoscopic image by the stereoscopic image display control apparatus 20 according to Embodiment 3. It should be noted that the same steps as those described with reference to FIG. 2 of Embodiment 1 and FIG. 9 of Embodiment 2 are given the same numerals, and a description thereof is omitted.

FIG. 13 is a diagram illustrating an example of an operation of the control unit 13 to control the rotational speed of a stereoscopic image displayed by the display unit 14, according to the amount of rotation calculated based on the amount of operation accepted by the input accepting unit 12, and the state of the stereoscopic image currently displayed by the display unit 14. FIG. 13 has step S2007 added to steps in FIG. 2 of Embodiment 1, and is for handling the case in which when a user operation is detected, the amount of rotation is continuously calculated based on the actual amount of user operation, and thereby the amount of rotation changes according to the amount of operation.

The following is a description of operations of steps S2001, S2007, and S2002, mainly focusing on step S2007. It should be noted that the operations in step S2003 and the steps thereafter are the same as those in FIG. 2 of Embodiment 1, and thus a description thereof is omitted.

(Step S2001) If the control unit 13 detects that a change instruction from a user has been accepted by the input accepting unit 12 (YES in step S2001), the processing proceeds to step S2007, whereas if the control unit 13 does not detect that (NO in step S2001), the processing returns to step S2001.

(Step S2007) The operation amount calculation unit 133 calculates the amount of rotation of a stereoscopic image according to the amount of operation included in the change instruction accepted by the input accepting unit 12, and the processing proceeds to step S2002.

(Step S2002) The change amount prediction unit 131 predicts the amounts of change in projection and recession in unit time to be caused when the stereoscopic image is rotated by the calculated amount of rotation, based on the amount of rotation calculated by the operation amount calculation unit 133 and the state of the stereoscopic image currently displayed by the display unit 14, and the processing proceeds to step S2003.

FIG. 14 is a diagram illustrating an example of a method for controlling the rotational speed of a stereoscopic image, according to the amount of rotation calculated based on the amount of operation accepted by the input accepting unit 12 and the state of the stereoscopic image currently displayed by the display unit 14. FIG. 14 includes step S2007 added to steps in FIG. 9 of Embodiment 2, and is for handling the case in which when a user operation is detected, the amount of rotation is calculated based on the actual amount of user operation, and thereby the amount of rotation changes according to the amount of operation. Steps S2001, S2007, and S2002 are the same as those of FIG. 13 described above, the operation in step S2003 and steps thereafter is the same as that of FIG. 9 of Embodiment 2, and thus a description thereof is omitted.

In the above manner, the amount of rotation of a stereoscopic image can be calculated in accordance with the actual amount of user operation. In addition, when a stereoscopic image is changed following the operation, if at least one of the amounts of change in projection and recession of the stereoscopic image in unit time exceeds a predetermined threshold value, the rotational speed of the stereoscopic image is decreased. As a result, a rapid change in the amount of projection and the amount of recession can be prevented, thereby achieving effects of reducing the fatigue of a viewer.

OTHER EMBODIMENTS

Embodiments 1 to 3 describe methods for preventing a rapid change in the amounts of projection and recession by decreasing the rotational speed of a stereoscopic image if at least one of the amounts of change in projection and recession of the stereoscopic image in unit time exceeds a predetermined threshold value, when the state of the stereoscopic image is changed following a user operation, as the operation of stereoscopic image display control apparatuses 10 and 20. However, the method for preventing a rapid change in the amounts of projection and recession is not limited to the above methods.

Figure 15:
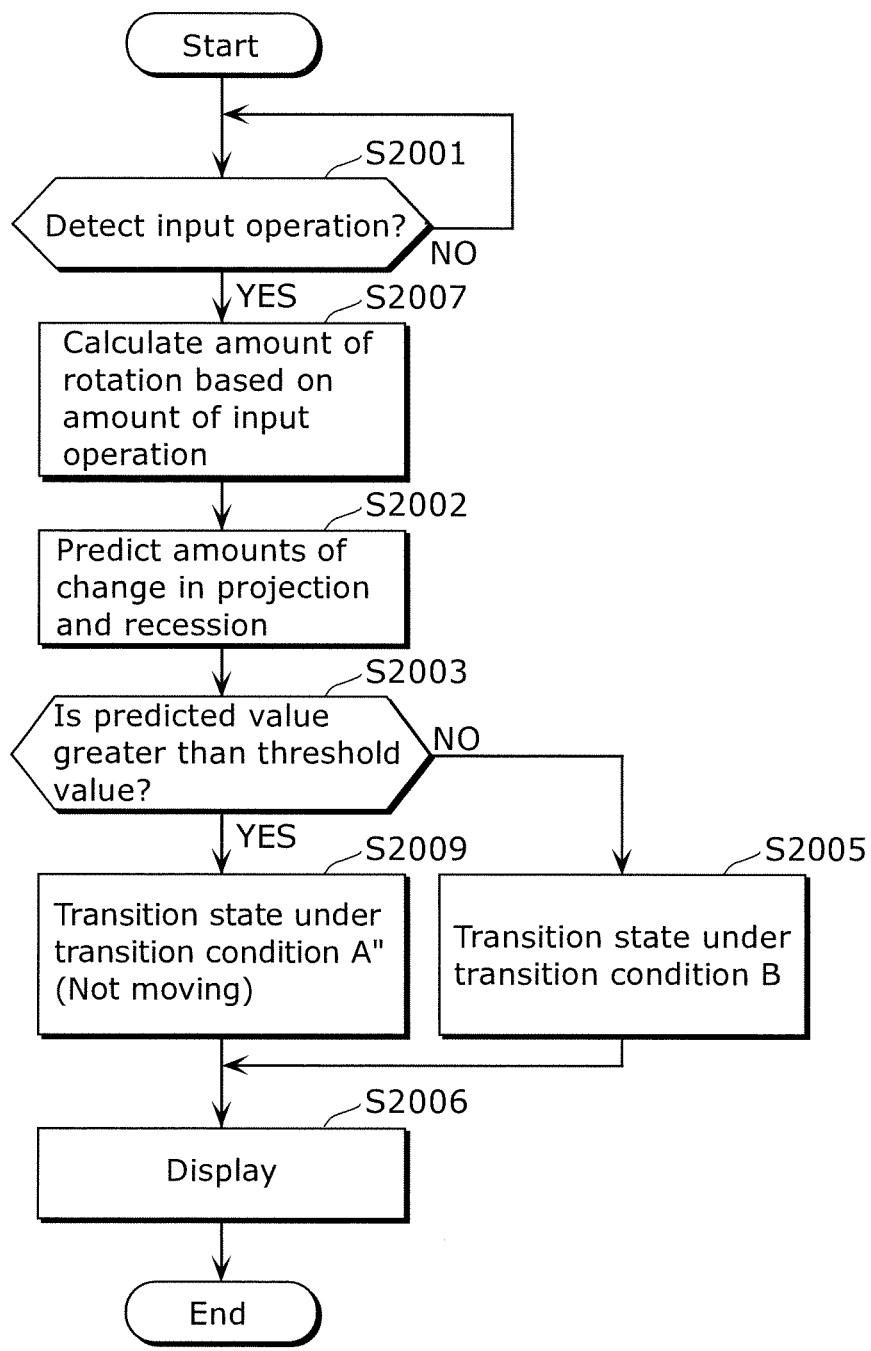
FIG. 15 is a flowchart of a stereoscopic image display control method according to a variation of Embodiment 3.

For example, as illustrated in FIG. 15, if at least one of the amounts of change in projection and recession of a stereoscopic image in unit time exceeds a threshold value, transition condition A" for not performing rotating operation (rotational speed is set to 0) may be adopted as illustrated in step S2009. It is sufficient that a rapid change in the amounts of projection and recession of a stereoscopic image can be prevented by such a method, thereby reducing fatigue of a viewer.

Figure 16:
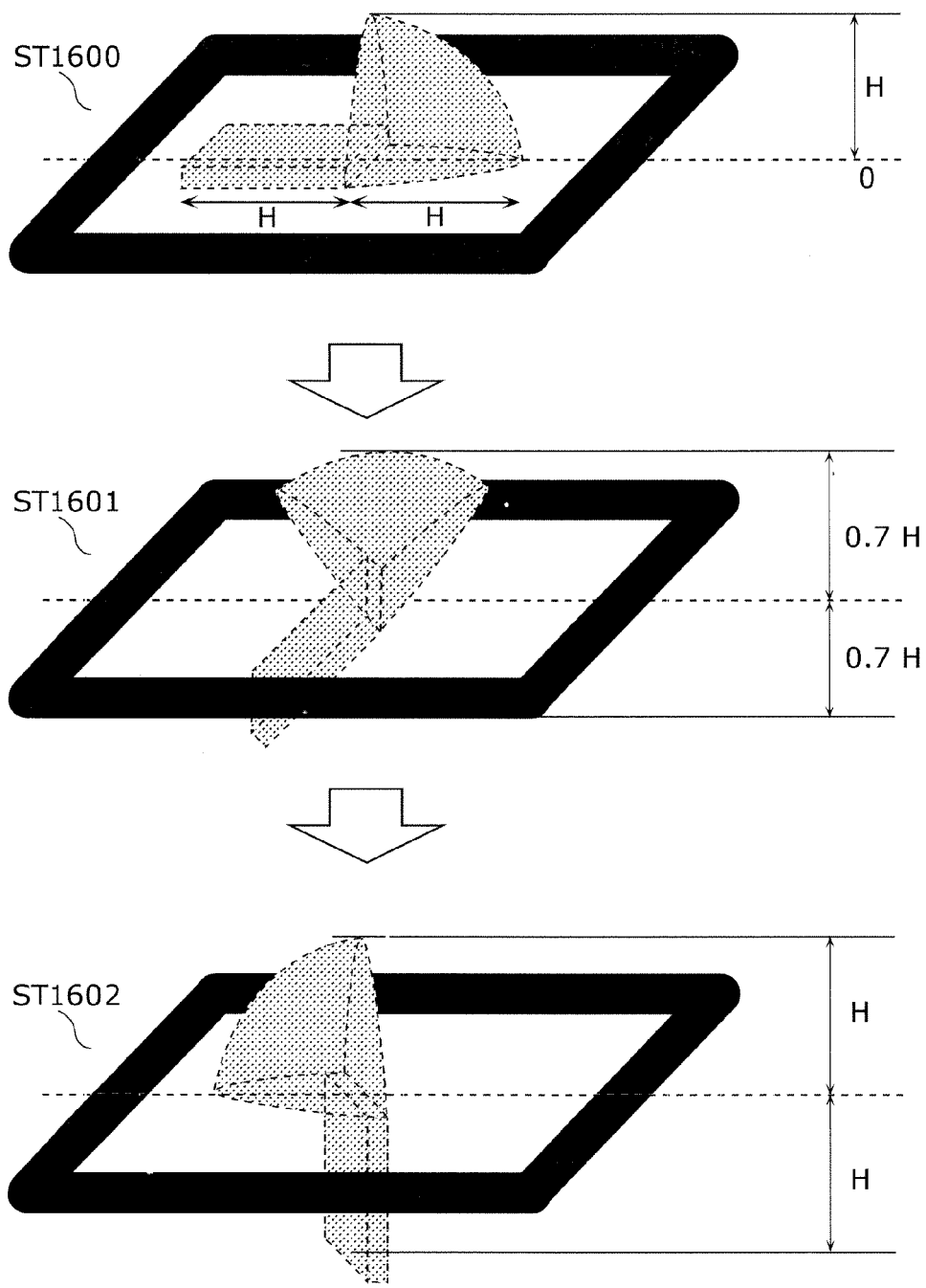
FIG. 16 is a diagram illustrating examples of rotation of a stereoscopic image asymmetrical to the center of rotation.

In addition, Embodiments 1 to 3 describe examples of a rectangular parallelepiped and a sphere whose amounts of projection and recession change in the same manner. However, as illustrated in FIG. 16, the control methods according to the above embodiments are even applicable to a stereoscopic image whose amounts of projection and recession are different. The following is a description, with reference to FIGS. 16 and 17, of another example of a case in which when a stereoscopic image whose amounts of projection and recession are different is rotated, the stereoscopic image display control apparatus 10 according to Embodiment 1 controls the rotational speed of the stereoscopic image.

In FIG. 16, a case is assumed in which the stereoscopic image display control apparatus 10 stereoscopically displays a stereoscopic image, and the stereoscopic image displayed by a display unit 14 rotates 45 degrees at one time in response to one user operation. First, initial state ST1600 shows a state in which the amount of projection at a point of the stereoscopic image projecting most is "0", and the amount of recession at a point of the stereoscopic image receding most is "0", the stereoscopic image being displayed by the display unit 14.

Next, one user operation causes the stereoscopic image displayed by the display unit 14 to shift from initial state ST1600 to state ST1601 by rotating 45 degrees. The amount of projection at the most projecting point in state ST1601 is "H", and the amount of recession at the most receding point is about "−0.7 H". Next, another user operation causes the stereoscopic image displayed by the display unit 14 to shift from state ST501 to state ST502 by further rotating 45 degrees. The amount of projection at the most projecting point in state ST1602 is "H", and the amount of recession at the most receding point is "−H".

Figure 17:
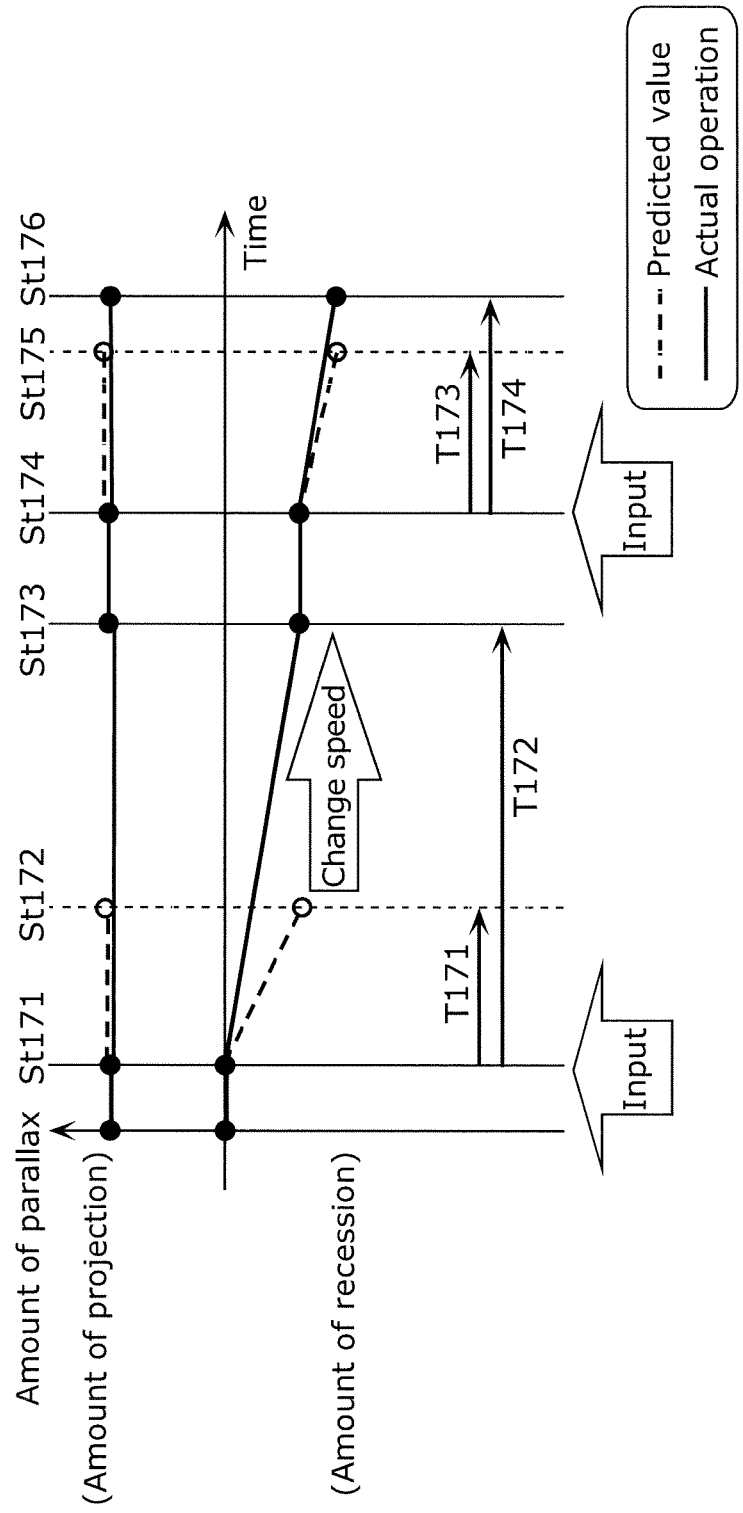
FIG. 17 is a diagram illustrating a result of controlling a rotational speed of the stereoscopic image illustrated in FIG. 16.

Next is a description, with reference to FIG. 17, of a specific method of controlling the rotational speed of the stereoscopic image in each of the case in which initial state ST1600 transitions to state ST1601 and the case in which state ST1601 transitions to state ST1602, the states being illustrated in FIG. 16.

The vertical axis in FIG. 17 illustrates the amount of projection and the amount of recession of a stereoscopic image, and the horizontal axis illustrates a time period.

First, initial state ST1600 in FIG. 16 corresponds to state St171 in FIG. 17 (the amount of projection at the most projecting point is "H", and the amount of recession at the most receding point is "0"). If the amounts of change in projection and recession in unit time to be caused when a user operation causes the stereoscopic image to rotate 45 degrees from state St171 are predicted, the amount of change in projection in unit time is "0", and the amount of change in recession in unit time is about "−0.7 H".

Here, although the amount of change in projection in unit time does not exceed a threshold value (which is 0.25 H in this example), the amount of change in recession in unit time exceeds the threshold value (which is 0.25 H in this example), and thus a display control unit 132 decreases the rotational speed of the stereoscopic image.

The transition from state St171 to state St172 illustrated in FIG. 17 is based on predicted values, and shows the case in which the stereoscopic image rotates 45 degrees during time T71. However, a variation in the amount of recession in unit time will be too large if no change is made. In view of this, the rotational speed of the stereoscopic image is changed (decreased) based on the predicted values such that the stereoscopic image rotates 45 degrees during time T172 (longer than time T171) from state St171 to state St173.

In other words, if the rotational speed is not controlled, the stereoscopic image rotates 45 degrees during time T171, and thus the amount of recession changes rapidly. However, the stereoscopic image rotates 45 degrees during time T172 (>T171) by the control of the rotational speed, and thus a rapid change in the amount of recession can be prevented. State St173 after this transition corresponds to state ST1601 in FIG. 16.

Next, a time period from state St173 to state St174 in FIG. 17 shows a time when the display state is not changed since there is no user operation. Next, if the amounts of change in projection and recession in unit time to be caused when a user operation in state St174 causes the stereoscopic image to rotate 45 degrees are predicted, the amount of change in projection in unit time is "0", and the amount of change in recession in unit time is about "−0.3 H". Thus, although the amount of change in projection in unit time does not exceed the threshold value (which is 0.25 H in this example), the amount of change in recession in unit time exceeds the threshold value (which is 0.25 H in this example), and thus the display control unit 132 decreases the rotational speed of the stereoscopic image.

The transition from state St174 to state St175 illustrated in FIG. 17 is based on predicted values, and shows the case in which the stereoscopic image rotates 45 degrees during time T173. However, a variation in the amount of recession in unit time will be too large if no change is made. In view of this, the rotational speed of the stereoscopic image is changed (decreased) based on the predicted values such that the stereoscopic image rotates 45 degrees during time T174 (longer than time T173) from state St174 to state St176.

In other words, if the rotational speed is not controlled, the stereoscopic image rotates 45 degrees during time T173, and thus the amount of recession changes rapidly. However, the stereoscopic image rotates 45 degrees during time T174 (>T173) by the control of the rotational speed, and thus a rapid change in the amount of recession can be prevented. State St176 after this transition corresponds to state ST1602 in FIG. 16.

As described above, even if the state of a stereoscopic image is changed whose amounts of change in projection and recession in unit time are different, the rotational speed is adjusted if at least one of the amounts of change in projection and recession in unit time exceeds the threshold value. Accordingly, even in the case of a stereoscopic image whose amounts of projection and recession in unit time are different, the rotational speed thereof can be adjusted.

It should be noted that the examples described with reference to FIGS. 16 and 17 both show the case in which the state transitions under transition condition A in step S2004 in FIG. 2. In this manner, even if the amounts of change in projection and recession in unit time are different, the control method according to Embodiment 1 is applicable, and the methods described in Embodiments 2 and 3 are also applicable, similarly.

In addition, in Embodiments 1 to 3 above, in the case as illustrated in FIG. 7, the display control unit 132 determines that the amounts of change in projection and recession in unit time do not exceed the threshold value. In the example in FIG. 7, the amounts of projection (recession) are the same at a point of the stereoscopic image projecting most (a point of the stereoscopic image receding most) at the start of the unit time and at a point of the stereoscopic image projecting most (a point of the stereoscopic image receding most) at the end of the unit time.

Specifically, a change amount prediction unit 131 according to Embodiments 1 to 3 above predicts the amount of change in projection (recession) in unit time by focusing on a difference between the amounts of projection (recession) at the most projecting point at the start and the end of the unit time.

Figure 18:
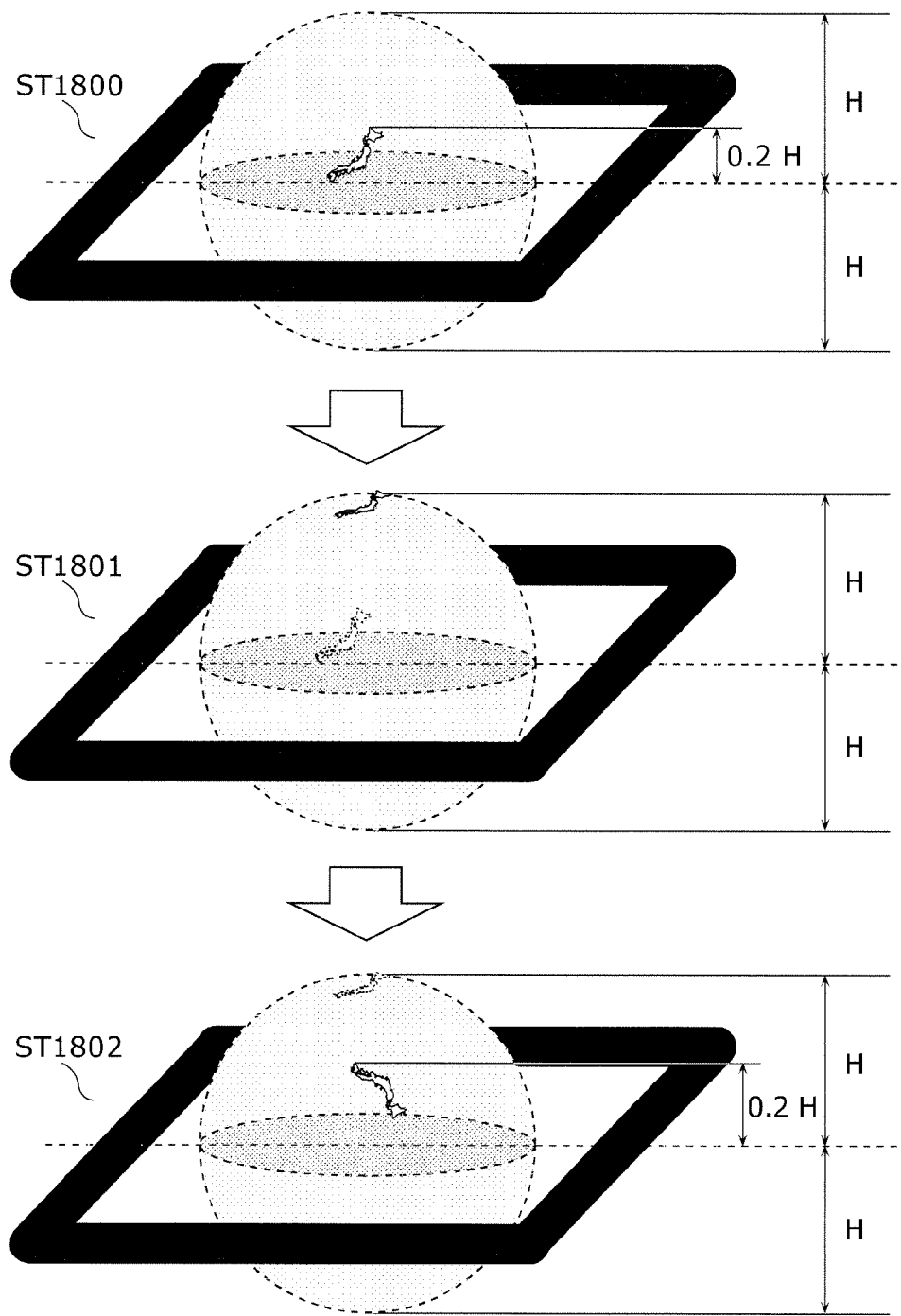
FIG. 18 is a diagram illustrating examples of rotating a stereoscopic image having a pattern on its surface.

However, as illustrated in FIG. 18, if a sphere having a pattern on its surface (the pattern in the example in FIG. 18 is the Japanese Islands) is rotated, the eyes of a user may pursue the pattern.

In such a case, the change amount prediction unit 131 may predict, as an amount of change in projection in unit time, a difference between the amounts of projection at the start and the end of the unit time at a specific point of a stereoscopic image. Similarly, the change amount prediction unit 131 may predict, as an amount of change in recession in unit time, a difference between the amounts of recession at the start and the end of the unit time at a specific point of a stereoscopic image.

First, initial state ST1800 in FIG. 18 shows a state in which the amount of projection at the Japanese Islands (an example of a specific point) on the surface of the sphere displayed by the display unit 14 is "0.2 H". Next, one user operation causes the sphere displayed by the display unit 14 to rotate (the Japanese Islands to rotate so as to move toward the zenith), and the state thereof changes to state ST1801. The amount of projection at the Japanese Islands in state ST1801 is "H".

At this time, the change amount prediction unit 131 can predict the amount of change in projection in unit time, by dividing "0.8 H" by a time period to be used for the sphere to change from state ST1800 to state ST1801, 0.8 H indicating the difference between "0.2 H" which is the amount of projection at the Japanese Islands before rotation and "H" which is the amount of projection at the Japanese Islands after rotation. Then, the display control unit 132 decreases the rotational speed of the sphere if the amount of projection calculated by the change amount prediction unit 131 exceeds the threshold value.

Next, another user operation causes the sphere displayed by the display unit 14 to rotate (so that the Japanese Islands come near the equator on the back side), and the state thereof changes to state ST1802. The amount of projection of the Japanese Islands in state ST1802 is "0.2 H".

At this time, the change amount prediction unit 131 predicts an amount of change in projection in unit time by dividing "−0.8 H" by a time period to be used for the sphere to shift from state ST1801 to state ST1802, −0.8 H indicating the difference between "H" which is the amount of projection of the Japanese Islands before rotation and "0.2 H" which is the amount of projection of the Japanese Islands after rotation. Then, the display control unit 132 decreases the rotational speed of the sphere if the amount of projection calculated by the change amount prediction unit 131 exceeds the threshold value.

The above processing is applicable not only to the prediction of the amount of change in projection in unit time, but also to the case of predicting the amount of change in recession in unit time. Specifically, if the sphere illustrated in FIG. 18 is to be rotated in the opposite direction to that in the above example, the amount of change in recession in unit time may be predicted through the above processing.

It is not necessary to apply the above processing to all the patterns (texture) given to the stereoscopic image. For example, the above processing may be selectively applied to a pattern positioned at a point of the stereoscopic image projecting most or at a point of the stereoscopic image receding most.

Furthermore, a point of the stereoscopic image at which the above processing is applied is not limited to a pattern given to the stereoscopic image. For example, when a finger is put on a stereoscopic image displayed by the display unit 14 (the example is not limited to a finger, and a hand or an object for pointing such as a handheld pointer may be used), the stereoscopic image is rotated (the state there of is changed) by moving the finger by the amount of the movement thereof and in the direction in which the finger is moved, the above processing may be applied to a point of the stereoscopic image on which the finger is put.

In addition, although Embodiments 1 to 3 above describe rotating a stereoscopic image as a method of changing the display of the stereoscopic image by way of example, the change in the state of a stereoscopic image in response to an operation is not limited to rotation, and may be movement, enlargement, reduction, or the like.

In addition, although Embodiments 1 to 3 above describe rotating a stereoscopic image about its center of gravity as a method of changing the display of the stereoscopic image, by way of example. However, the center of rotation of a stereoscopic image in response to an operation is not limited to the center of gravity of the stereoscopic image, and such control is applicable even in the case in which a stereoscopic image is rotated about a given position.

It should be noted that although the present disclosure has been described based on the above embodiments, the present disclosure is not certainly limited to the above embodiments. The present disclosure also includes the followings.

(1) Specifically, each apparatus described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each apparatus to achieve its functionality. Here, the computer program includes a combination of instruction codes indicating instructions to a computer in order to achieve given functionality.

A part or all of constituent elements included in each apparatus described above may include a single system large scale integration (LSI: large scale integrated circuit). The system LSI is a super multi-function LSI manufactured by integrating multiple components in one chip, and is specifically a computer system configured so as to include a microprocessor, a ROM, a RAM, and so on. A computer program is stored in the RAM. The system LSI accomplishes its functions through the load of the computer program from the ROM to the RAM by the microprocessor and the operation of the microprocessor in accordance with the computer program.

(3) A part or all of constituent elements included in each apparatus described above may include an IC card or a single module which can be attached to or detached from the apparatus. The IC card or the module is a computer system which includes a microprocessor, a ROM, a RAM, and the like. The above super-multifunctional LSI may be included in the IC card or the module. The IC card or the module accomplishes its functions through the operation of the microprocessor in accordance with the computer program. This IC card or module may have tamper resistant properties.

(4) The techniques disclosed herein may be achieved by the methods described above. In addition, these methods may be achieved by a computer program implemented by a computer, or may be implemented by a digital signal which includes a computer program.

In addition, the techniques disclosed herein may be achieved by a computer program or a digital signal stored in a computer-readable recording medium such as, for example, a flexible disk, a hard disk, CD-ROM, MO, DVD, DVD- ROM, DVD-RAM, a blue-ray disc (BD), or a semiconductor memory. Alternatively, the techniques disclosed herein may be achieved by a digital signal stored in such a recording medium.

In addition, with the techniques disclosed herein, the computer program or the digital signal may be transmitted via, for instance, data broadcasting or a network typified by electric telecommunication lines, wireless or wired communication lines, and the Internet.

In addition, the present disclosure is a computer system which includes a microprocessor and a memory, the memory may have stored therein a computer program, and the microprocessor may operate in accordance with the computer program.

In addition, another independent computer system may implement a program or a digital signal which has been stored in a recording medium and transported thereto or a program or a digital signal transported via a network or the like.

(5) The above embodiments and the above variation may be combined.

The above is a description of embodiments with reference to the drawings; however, the present disclosure is not limited to the illustrated embodiments. It is possible to add various modifications and changes to the illustrated embodiments within the scope of the claims or within the equivalent scope.

INDUSTRIAL APPLICABILITY

The stereoscopic image display control apparatus and the stereoscopic image display control method according to the present disclosure automatically control the rotational speed and the amount of rotation of a stereoscopic image in response to an operation in such a manner that fatigue of a viewer can be reduced, thereby preventing a rapid change in the amount of projection and the amount of recession of the stereoscopic image. Although such a stereoscopic image display control apparatus and such a stereoscopic image display control method are mainly used for AV equipment such as TVs and mobile terminals which include personal digital assistants and tablet terminals, the stereoscopic image display control apparatus and the stereoscopic image display control method according to one or more exemplary embodiments disclosed herein are applicable to apparatuses capable of displaying stereoscopic images, and also applicable to general displays, for instance, capable of displaying stereoscopic images.

The invention claimed is:

1. A stereoscopic image display control apparatus for causing a display device to display a stereoscopic image, the stereoscopic image display control apparatus comprising:
    an output unit configured to output the stereoscopic image to the display device, based on a state of the stereoscopic image;
    an input accepting unit configured to accept, from a user, input of a change instruction to change the state of the stereoscopic image displayed by the display device;
    a change amount prediction unit configured to predict amounts of change in projection and recession of the stereoscopic image in unit time to be caused when the state of the stereoscopic image is changed in accordance with the change instruction accepted by the input accepting unit; and
    a display control unit configured to change the state of the stereoscopic image to be outputted from the output unit, in accordance with the change instruction accepted by the input accepting unit,
    wherein when one of the amounts of change in projection and recession in unit time predicted by the change amount prediction unit exceeds a predetermined threshold value, the display control unit is configured to decrease a change speed of the state of the stereoscopic image to cause the one of the amounts of change, in unit time, in projection and recession of the stereoscopic image to be outputted from the output unit to be smaller than or equal to the threshold value,
    the change amount prediction unit is configured to: predict, as the amount of change in projection in unit time, a difference between amounts of projection at points of the stereoscopic image which project most from a display surface of the display device at a start and an end of the unit time; and
    predict, as the amount of change in recession in unit time, a difference between amounts of recession at points of the stereoscopic image which recede most from the display surface of the display device at a start and an end of the unit time.

2. The stereoscopic image display control apparatus according to claim 1,
    wherein the change instruction includes information for identifying an amount of change in the state of the stereoscopic image, and a change time to be used for changing the state of the stereoscopic image by the amount of change, and
    when one of the amounts of change in projection and recession in unit time predicted by the change amount prediction unit exceeds the threshold value, the display control unit is configured to change the state of the stereoscopic image by the amount of change, taking a time longer than the change time.

3. The stereoscopic image display control apparatus according to claim 1,
    wherein the change instruction includes information for identifying an amount of change in the state of the stereoscopic image, and a change time to be used for changing the state of the stereoscopic image by the amount of change, and
    when one of the amounts of change in projection and recession in unit time predicted by the change amount prediction unit exceeds the threshold value, the display control unit is configured to change the state of the stereoscopic image by an amount smaller than the amount of change during the change time.

4. The stereoscopic image display control apparatus according to claim 1, wherein when one of the amounts of change in projection and recession in unit time predicted by the change amount prediction unit exceeds the threshold value, the display control unit is configured not to change the state of the stereoscopic image in accordance with the change instruction.

5. The stereoscopic image display control apparatus according to claim 1, wherein the change instruction to change the state of the stereoscopic image accepted by the input accepting unit includes moving, rotating, enlarging, or reducing the stereoscopic image.

6. The stereoscopic image display control apparatus according to claim 1, wherein the input accepting unit is configured to accept the change instruction indicating a predetermined amount of change, through a predefined input operation by a user.

7. The stereoscopic image display control apparatus according to claim 1, wherein the input accepting unit is configured to accept the change instruction indicating an amount of change according to a magnitude of an input operation by a user.

8. The stereoscopic image display control apparatus according to claim 1, further comprising the display device.

9. A stereoscopic image display control apparatus for causing a display device to display a stereoscopic image, the stereoscopic image display control apparatus comprising:
an output unit configured to output the stereoscopic image to the display device, based on a state of the stereoscopic image;
an input accepting unit configured to accept, from a user, input of a change instruction to change the state of the stereoscopic image displayed by the display device;
a change amount prediction unit configured to predict amounts of change in projection and recession of the stereoscopic image in unit time to be caused when the state of the stereoscopic image is changed in accordance with the change instruction accepted by the input accepting unit; and
a display control unit configured to change the state of the stereoscopic image to be outputted from the output unit, in accordance with the change instruction accepted by the input accepting unit,
wherein when one of the amounts of change in projection and recession in unit time predicted by the change amount prediction unit exceeds a predetermined threshold value, the display control unit is configured to decrease a change speed of the state of the stereoscopic image to cause the one of the amounts of change, in unit time, in projection and recession of the stereoscopic image to be outputted from the output unit to be smaller than or equal to the threshold value,
the change amount prediction unit is configured to: predict, as the amount of change in projection in unit time, a difference between amounts of projection at a specific point of the stereoscopic image at a start and an end of the unit time; and
predict, as the amount of change in recession in unit time, a difference between amounts of recession at the specific point of the stereoscopic image at a start and an end of the unit time.

10. The stereoscopic image display control apparatus according to claim 9,
wherein the change instruction includes information for identifying an amount of change in the state of the stereoscopic image, and a change time to be used for changing the state of the stereoscopic image by the amount of change, and
when one of the amounts of change in projection and recession in unit time predicted by the change amount prediction unit exceeds the threshold value, the display control unit is configured to change the state of the stereoscopic image by the amount of change, taking a time longer than the change time.

11. The stereoscopic image display control apparatus according to claim 9,
wherein the change instruction includes information for identifying an amount of change in the state of the stereoscopic image, and a change time to be used for changing the state of the stereoscopic image by the amount of change, and
when one of the amounts of change in projection and recession in unit time predicted by the change amount prediction unit exceeds the threshold value, the display control unit is configured to change the state of the stereoscopic image by an amount smaller than the amount of change during the change time.

12. The stereoscopic image display control apparatus according to claim 9, wherein when one of the amounts of change in projection and recession in unit time predicted by the change amount prediction unit exceeds the threshold value, the display control unit is configured not to change the state of the stereoscopic image in accordance with the change instruction.

13. The stereoscopic image display control apparatus according to claim 9, wherein the change instruction to change the state of the stereoscopic image accepted by the input accepting unit includes moving, rotating, enlarging, or reducing the stereoscopic image.

14. The stereoscopic image display control apparatus according to claim 9, wherein the input accepting unit is configured to accept the change instruction indicating a predetermined amount of change, through a predefined input operation by a user.

15. The stereoscopic image display control apparatus according to claim 9, wherein the input accepting unit is configured to accept the change instruction indicating an amount of change according to a magnitude of an input operation by a user.

16. The stereoscopic image display control apparatus according to claim 9, further comprising the display device.

17. A stereoscopic image display control method for causing a display device to display a stereoscopic image, the method comprising:
outputting the stereoscopic image to the display device, based on a state of the stereoscopic image;
accepting, from a user, input of a change instruction to change the state of the stereoscopic image displayed by the display device;
predicting amounts of change in projection and recession of the stereoscopic image in unit time to be caused when the state of the stereoscopic image is changed in accordance with the change instruction accepted in the acceptance; and
changing the state of the stereoscopic image to be outputted in the output, in accordance with the change instruction accepted in the acceptance,
wherein when one of the amounts of change in projection and recession in unit time predicted in the prediction exceeds a predetermined threshold value, a change speed of the state of the stereoscopic image is decreased in the change to cause the one of the amounts of change, in unit time, in projection and recession of the stereoscopic image to be outputted in the output to be smaller than or equal to the threshold value,
the step of predicting includes predicting, as the amount of change in projection in unit time, a difference between amounts of projection at points of the stereoscopic image which project most from a display surface of the display device at a start and an end of the unit time; and
predicting, as the amount of change in recession in unit time, a difference between amounts of recession at points of the stereoscopic image which recede most from the display surface of the display device at a start and an end of the unit time.

18. A non-transitory computer-readable recording medium for causing a computer to cause a display device to display a stereoscopic image, the medium causing the computer to execute:
outputting the stereoscopic image to the display device, based on a state of the stereoscopic image;

accepting, from a user, input of a change instruction to change the state of the stereoscopic image displayed by the display device;

predicting amounts of change in projection and recession of the stereoscopic image in unit time to be caused when the state of the stereoscopic image is changed in accordance with the change instruction accepted in the acceptance; and changing the state of the stereoscopic image to be outputted in the output, in accordance with the change instruction accepted in the acceptance, wherein when one of the amounts of change in projection and recession in unit time predicted in the prediction exceeds a predetermined threshold value, a change speed of the state of the stereoscopic image is decreased in the change to cause the one of the amounts of change, in unit time, in projection and recession of the stereoscopic image to be outputted in the output to be smaller than or equal to the threshold value, the step of predicting includes predicting, as the amount of change in projection in unit time, a difference between amounts of projection at points of the stereoscopic image which project most from a display surface of the display device at a start and an end of the unit time; and predicting, as the amount of change in recession in unit time, a difference between amounts of recession at points of the stereoscopic image which recede most from the display surface of the display device at a start and an end of the unit time.

19. A stereoscopic image display control method for causing a display device to display a stereoscopic image, the method comprising:

outputting the stereoscopic image to the display device, based on a state of the stereoscopic image;

accepting, from a user, input of a change instruction to change the state of the stereoscopic image displayed by the display device;

predicting amounts of change in projection and recession of the stereoscopic image in unit time to be caused when the state of the stereoscopic image is changed in accordance with the change instruction accepted in the acceptance; and changing the state of the stereoscopic image to be outputted in the output, in accordance with the change instruction accepted in the acceptance, wherein when one of the amounts of change in projection and recession in unit time predicted in the prediction exceeds a predetermined threshold value, a change speed of the state of the stereoscopic image is decreased in the change to cause the one of the amounts of change, in unit time, in projection and recession of the stereoscopic image to be outputted in the output to be smaller than or equal to the threshold value, the step of predicting includes predicting, as the amount of change in projection in unit time, a difference between amounts of projection at a specific point of the stereoscopic image at a start and an end of the unit time; and predicting, as the amount of change in recession in unit time, a difference between amounts of recession at the specific point of the stereoscopic image at a start and an end of the unit time.

20. A non-transitory computer-readable recording medium for causing a computer to cause a display device to display a stereoscopic image, the medium causing the computer to execute:

outputting the stereoscopic image to the display device, based on a state of the stereoscopic image;

accepting, from a user, input of a change instruction to change the state of the stereoscopic image displayed by the display device;

predicting amounts of change in projection and recession of the stereoscopic image in unit time to be caused when the state of the stereoscopic image is changed in accordance with the change instruction accepted in the acceptance; and changing the state of the stereoscopic image to be outputted in the output, in accordance with the change instruction accepted in the acceptance, wherein when one of the amounts of change in projection and recession in unit time predicted in the prediction exceeds a predetermined threshold value, a change speed of the state of the stereoscopic image is decreased in the change to cause the one of the amounts of change, in unit time, in projection and recession of the stereoscopic image to be outputted in the output to be smaller than or equal to the threshold value, the step of predicting includes predicting, as the amount of change in projection in unit time, a difference between amounts of projection at a specific point of the stereoscopic image at a start and an end of the unit time; and predicting, as the amount of change in recession in unit time, a difference between amounts of recession at the specific point of the stereoscopic image at a start and an end of the unit time.

* * * * *

UNITED STATES PATENT AND TRADEMARK OFFICE
CERTIFICATE OF CORRECTION

| | | |
|---|---|---|
| PATENT NO. | : 8,619,076 B2 | Page 1 of 1 |
| APPLICATION NO. | : 13/722635 | |
| DATED | : December 31, 2013 | |
| INVENTOR(S) | : Seiji Kubo et al. | |

It is certified that error appears in the above-identified patent and that said Letters Patent is hereby corrected as shown below:

ON THE TITLE PAGE, under the heading "Related U.S. Application Data:"

Item (63) should state:

-- (63)  Continuation of application No. PCT/JP2012/<u>003310</u>, filed on May 21, 2012. --

Signed and Sealed this
Second Day of September, 2014

Michelle K. Lee
*Deputy Director of the United States Patent and Trademark Office*